United States Patent
Hoja et al.

(10) Patent No.: US 9,571,373 B2
(45) Date of Patent: Feb. 14, 2017

(54) SYSTEM AND METHOD FOR COMBINING SERVER SIDE AND NETWORK SIDE TRANSACTION TRACING AND MEASUREMENT DATA AT THE GRANULARITY LEVEL OF INDIVIDUAL TRANSACTIONS

(71) Applicant: Compuware Corporation, Detroit, MI (US)

(72) Inventors: Krzysztof Hoja, Gdansk (PL); Marcin Okraszewski, Gdansk (PL); Helmut Spiegl, Linz (AT); Bernd Greifeneder, Linz (AT)

(73) Assignee: Dynatrace LLC, Detroit, MI (US)

( * ) Notice: Subject to any disclaimer, the term of this patent is extended or adjusted under 35 U.S.C. 154(b) by 288 days.

(21) Appl. No.: 14/227,597

(22) Filed: Mar. 27, 2014

(65) Prior Publication Data

US 2014/0297846 A1 Oct. 2, 2014

Related U.S. Application Data

(60) Provisional application No. 61/806,449, filed on Mar. 29, 2013.

(51) Int. Cl.
*H04L 12/26* (2006.01)
*H04L 29/08* (2006.01)
*G06F 11/30* (2006.01)

(52) U.S. Cl.
CPC .............. *H04L 43/10* (2013.01); *G06F 11/30* (2013.01); *H04L 43/0817* (2013.01); *H04L 43/106* (2013.01); *H04L 43/12* (2013.01); *H04L 67/22* (2013.01)

(58) Field of Classification Search
CPC ......... H04L 67/22; H04L 43/10; H04L 43/106
See application file for complete search history.

(56) References Cited

U.S. PATENT DOCUMENTS

| | | | | |
|---|---|---|---|---|
| 6,144,961 | A * | 11/2000 | de la Salle | H04L 41/26 |
| 8,234,631 | B2 * | 7/2012 | Greifeneder | 717/128 |
| 8,832,665 | B2 * | 9/2014 | Greifeneder | G06F 11/3495 717/127 |
| 2009/0013070 | A1 * | 1/2009 | Srivastava | H04L 43/12 709/224 |

(Continued)

*Primary Examiner* — Lashonda Jacobs
(74) *Attorney, Agent, or Firm* — Harness, Dickey & Pierce, P.L.C.

(57) ABSTRACT

A performance monitoring and management system is provided for monitoring both server side and network side performance parameters of individual distributed transactions. The system uses correlation data which is transferred over a computer network to identify corresponding sender/receiver parts of a distributed transaction. Both server side tracing data and correlation data is transferred to an external correlation and monitoring server that creates per transaction end-to-end tracing data. Network probes are installed in the network infrastructures which monitor network conditions, like e.g. data transferred. Those network probes are configured in a way to identify and extract the correlation data used by the monitoring system and to tag created network measurements with this correlation data. Those tagged network measurements are then used to augment the per transaction end-to-end tracing data with corresponding network measurements.

31 Claims, 26 Drawing Sheets

(56) References Cited

U.S. PATENT DOCUMENTS

| | | | | |
|---|---|---|---|---|
| 2009/0049429 A1* | 2/2009 | Greifeneder | G06F 11/3495 | 717/128 |
| 2010/0318648 A1* | 12/2010 | Agrawal | G06F 11/3495 | 709/224 |
| 2011/0264790 A1* | 10/2011 | Haeuptle | G06F 11/3495 | 709/224 |
| 2011/0302294 A1* | 12/2011 | Oostlander | G06F 11/302 | 709/224 |
| 2011/0320540 A1* | 12/2011 | Oostlander | G06F 11/3006 | 709/206 |
| 2012/0170470 A1* | 7/2012 | Duchenay | H04L 43/106 | 370/252 |
| 2012/0297371 A1* | 11/2012 | Greifeneder | G06F 11/3495 | 717/128 |
| 2012/0304172 A1* | 11/2012 | Greifeneder | G06F 9/45504 | 718/1 |
| 2013/0185643 A1* | 7/2013 | Greifeneder | H04L 67/22 | 715/736 |

* cited by examiner

FIG 19
FIG 19a: TCP/IP Connection Endpoint Record
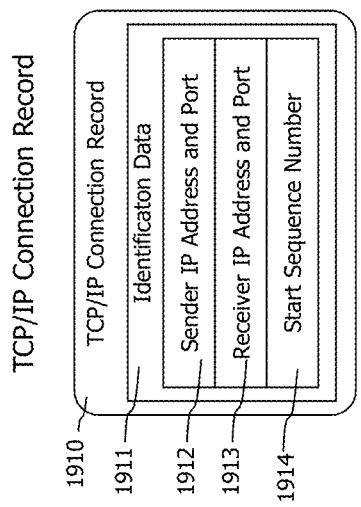
FIG 19b: TCP/IP Connection Record
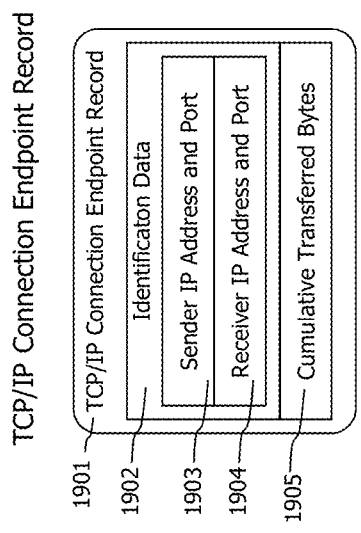

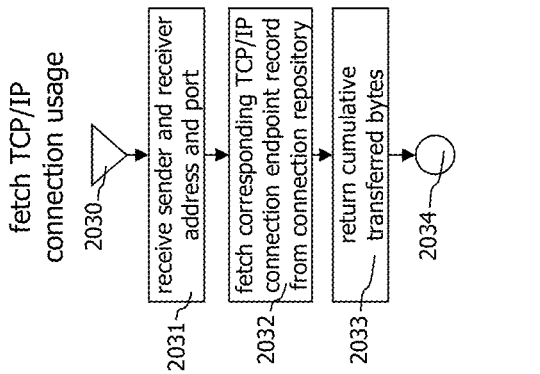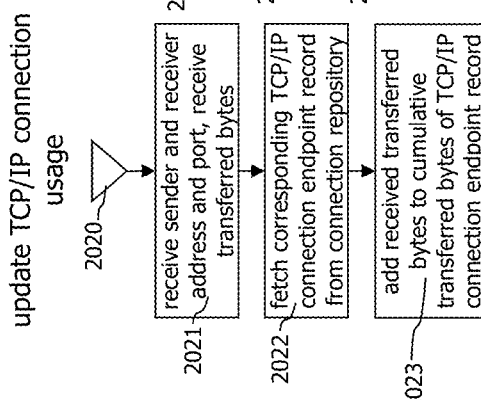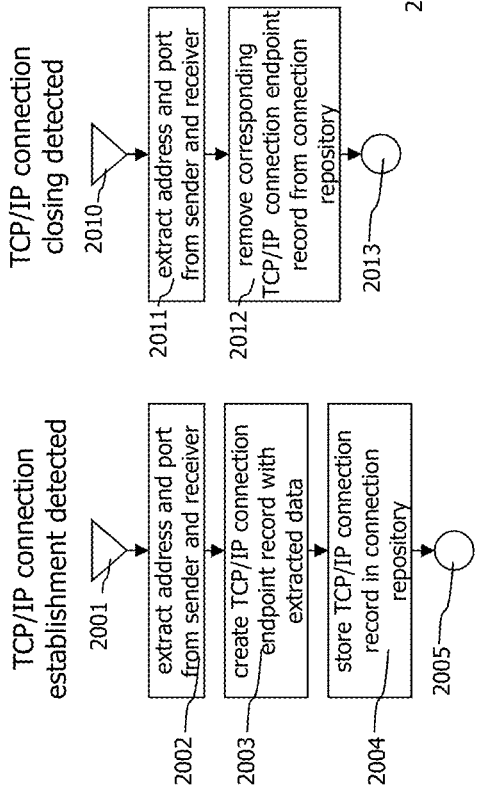

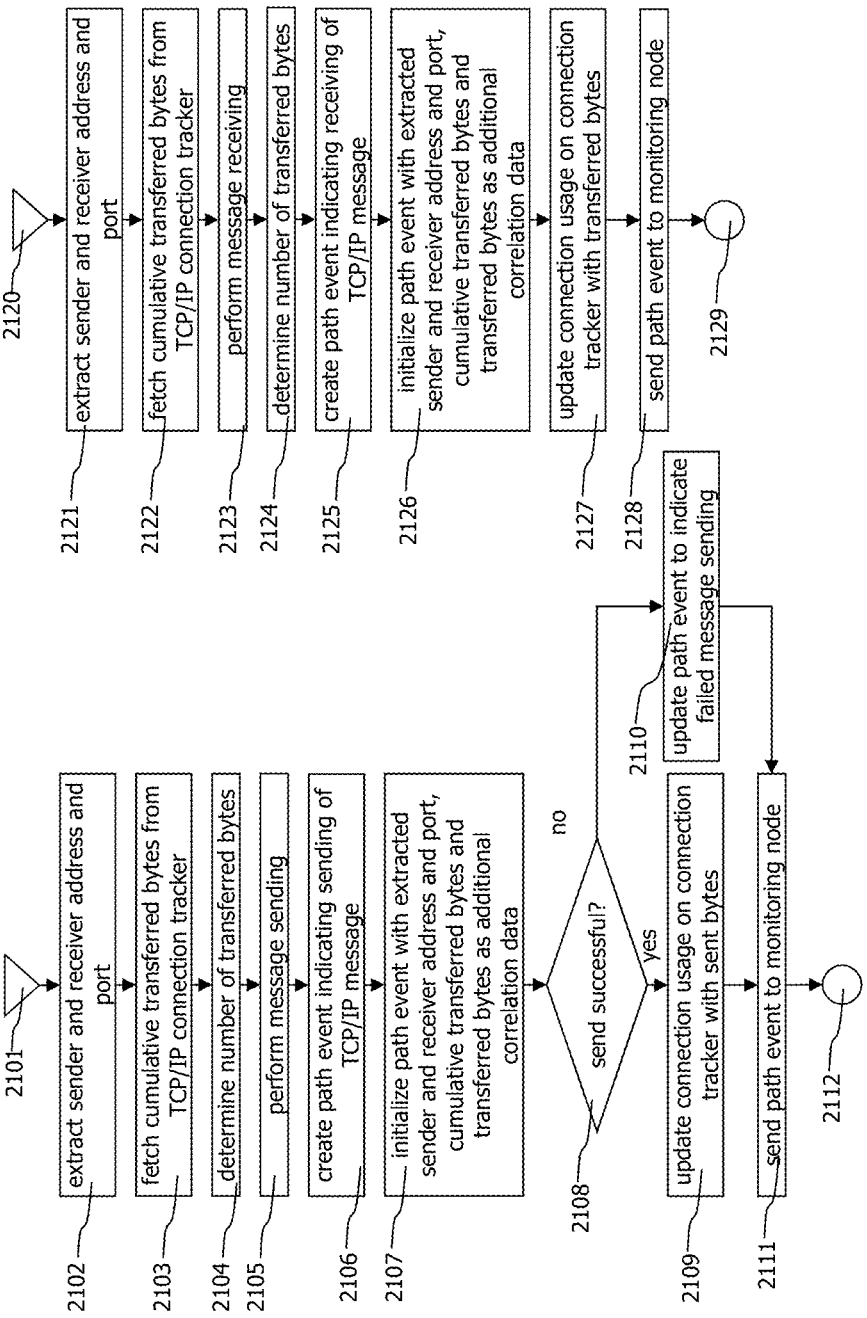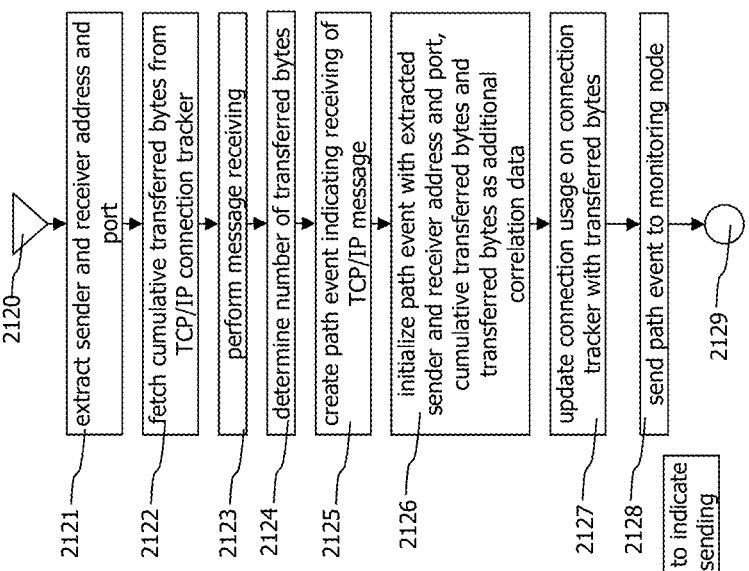

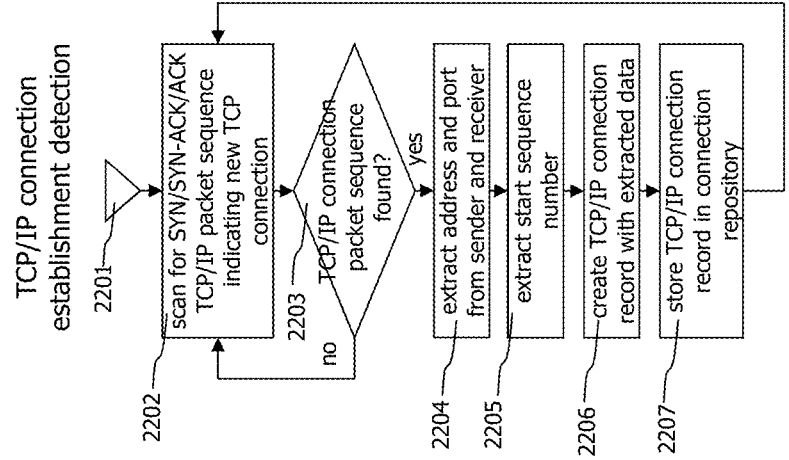
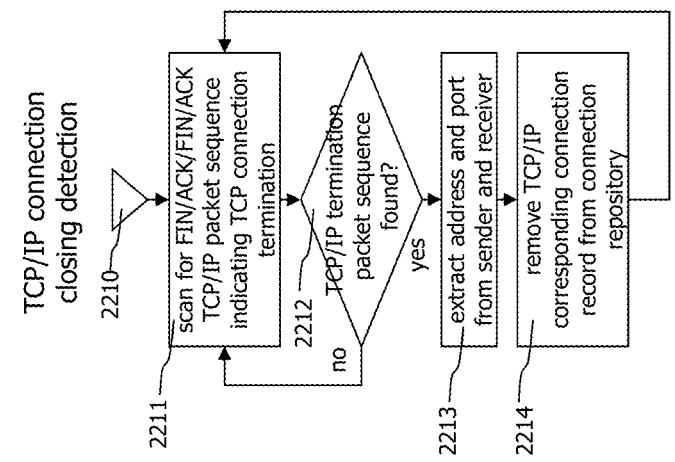
FIG 22

FIG 23
FIG 23a: TCP/IP Packet Analysis
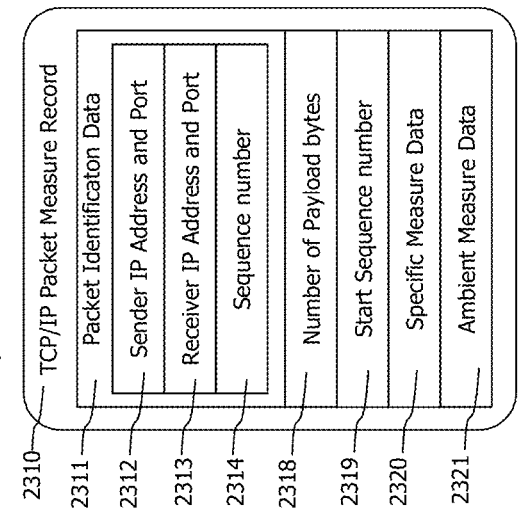
FIG 23b: TCP/IP Packet Measure Record
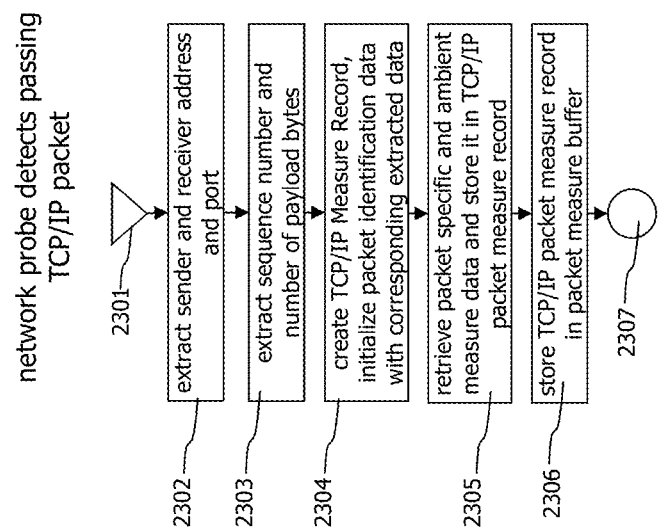

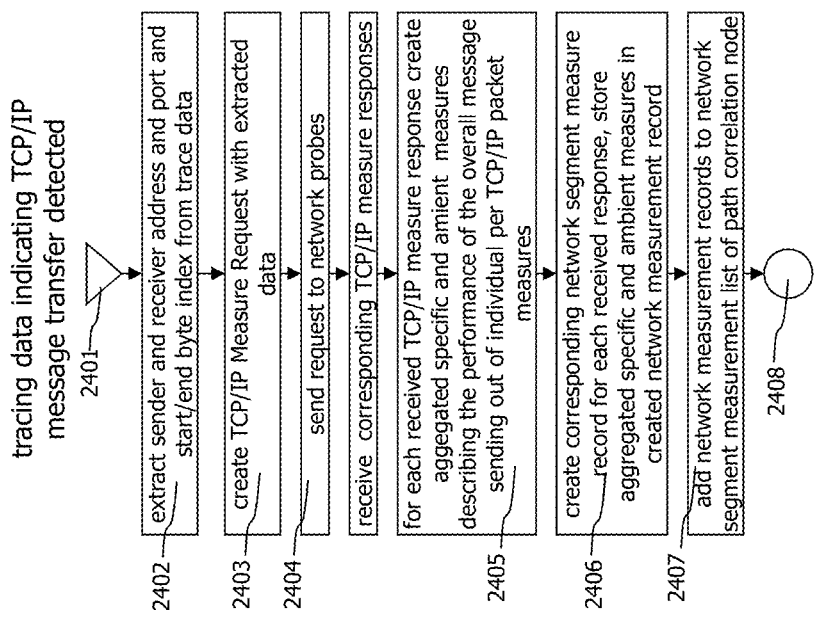
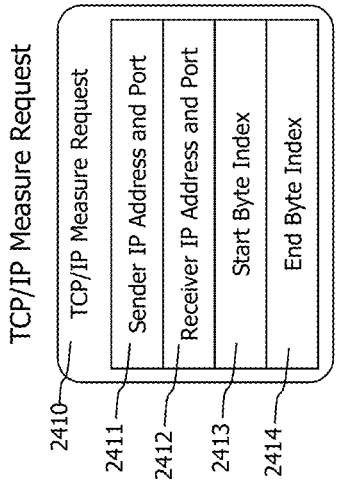
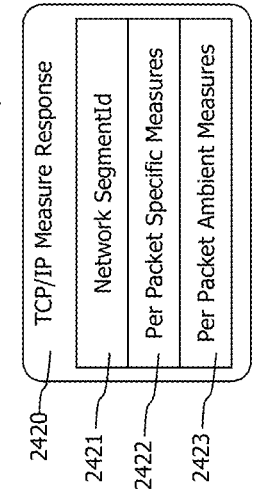
FIG 24

SYSTEM AND METHOD FOR COMBINING SERVER SIDE AND NETWORK SIDE TRANSACTION TRACING AND MEASUREMENT DATA AT THE GRANULARITY LEVEL OF INDIVIDUAL TRANSACTIONS

CROSS-REFERENCE TO RELATED APPLICATIONS

This application claims the benefit of U.S. Provisional Application No. 61/806,449, filed on Mar. 29, 2013. The entire disclosure of the above application is incorporated herein by reference.

FIELD

The present disclosure relates to the performance monitoring of individual distributed transactions, including and combining both performance parameters describing the server side processing of monitored transactions and performance measurements describing the network communication performed by different parts of the monitored distributed transactions.

BACKGROUND

Major design principles of modern applications are modularity, service orientation and elasticity. This leads to applications designed as a network of intercommunication service providers, which is dynamically adapted to changing application load conditions. The advantages of those design principles are highly flexible applications, both in terms of functionality and in terms of scalability.

In such architectures, the processing performed by a single processing node decreases, whereas the communication between different processing nodes increases to provide the desired application functionality.

As a consequence, the computer network connecting the computer systems that provide the services gains importance and becomes crucial for the performance behavior of the application.

Traditional server side performance monitoring systems, as e.g. described in U.S. Pat. No. 8,234,631 entitled "Method And System For Tracing Individual Transactions At The Granularity Level Of Method Calls Throughout Distributed Heterogeneous Applications Without Source Code Modifications" which is included in its entirety herein by reference, are capable to provide tracing and measurement data for individual transactions, but they fail to provide the visibility of the connecting computer network required to judge the performance situation of such massive distributed applications.

Additionally, there are network monitoring systems available which are capable to identify individual network communication transactions, like e.g. network activities related to request/response pairs created by communicating service provider application components. Those network monitoring systems are also capable to determine and report network conditions relevant for those individual network communication transactions. However, those systems are not capable to provide visibility of the server side processing as performed by the involved service provider components.

Current solutions to this problem include manual or semi-automated, timing based correlation of server side and network side tracing data and measurements. Due to the manual nature of this correlation process, the accuracy of the provided results is often insufficient and the process requires time consuming and often cumbersome human intervention.

Undisclosed field researches showed that monitoring systems that automatically integrate monitoring results from server and network side would dramatically reduce the average time to detect and fix performance degradations.

Besides such modern, service oriented applications, also traditional thin client/server oriented applications, like classical e-commerce applications consisting in a web server that provides content which is displayed by various client side web browsers could benefit from a combined server and network side monitoring system. For such applications, the visibility gap between monitoring systems reporting browser side activities as e.g. the system disclosed in U.S. patent application Ser. No. 13/722,026 entitled "Method And System For Tracing End-To-End Transaction, Including Browser Side Processing And End User Performance Experience" which is included in its entirety herein by reference, and server side monitoring systems would be closed.

Consequently, a method and system that overcomes the shortcomings of the current monitoring approaches and which is adequate for new service oriented application architectures is required.

This section provides background information related to the present disclosure which is not necessarily prior art

SUMMARY

This section provides a general summary of the disclosure, and is not a comprehensive disclosure of its full scope or all of its features.

Exemplary embodiments of the present disclosure may be used to combine results of server side application performance monitoring with corresponding network monitoring measures on the granularity level of individual network communication transactions, typically represented by a network request and a corresponding response. Those embodiments may be capable to associate network monitoring measurements and measurements representing corresponding server side activity for individual network communication transactions also if only a subset of the involved communication partners, e.g. only sender or receiver application is configured to be monitored by server side performance monitoring components.

Some other exemplary embodiments may be capable to trace, identify and monitor network traffic corresponding to network communication transactions caused by individual server side activities even if the network traffic is routed over various not monitored network traffic relay components, like e.g. proxy servers. Such embodiments may provide different measurements for different network sections, also on the granularity level of individual network transactions.

Yet other embodiments may, in case of a communication protocol that does not allow adding out-of-band correlation and tracing data to communication messages, use existing message identification data as correlation data to identify and combine individual network communication transactions with the corresponding server side tracing data for sender and receiver, and the corresponding network measurements.

Variants of these embodiments may, in case the communication protocol on application level is unknown, use attributes of the underlying network transport protocol as correlation data, like the sequence number field stored in the TCP header. The TCP sequence number may, together with usage data of a TCP/IP connection, be used to identify and correlate individual sender and receiver parts of a monitored transaction, and to also identify and correlate network measurements related to the transfer of the individual message exchanged between sender and receiver.

Embodiments of other variants of the present disclosure may store server side and network side tracing and measurement data in different, separate repositories. The network measurement data may be stored in a dedicated network measurement data repository together with correlation data to identify corresponding network transaction measurements for individual server side activities. Those variants of other embodiments may allow performing queries from the network measurement data repository to detect server side activities involved in specific, individual network transactions, and to query network measurements describing individual network transactions performed by specific server side transactions described by tracing data in a server side tracing data repository.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
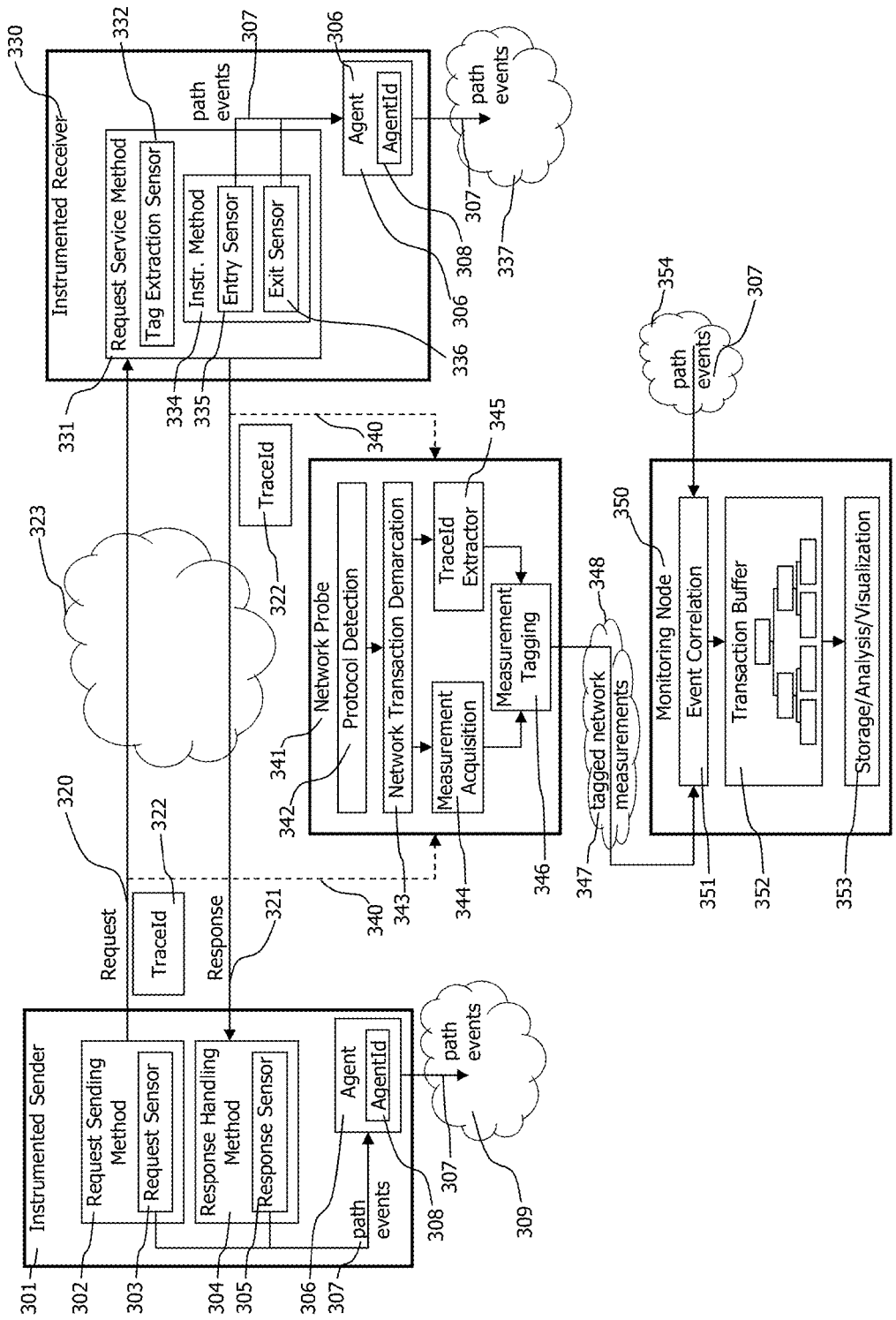

FIG. 3 provides an overview of an integrated server side and network monitoring system deployed to monitor server side activities of a sender and receiver application and the corresponding network traffic caused by sender/receiver communication. The monitoring system consists in agents deployed to sender and receiver to monitor server side activities, a network probe to monitor network traffic and a monitoring node to correlate tracing data describing server side activities of sender and receiver and to correlate and combine this server side tracing data with corresponding network monitoring data.

Figure 4:
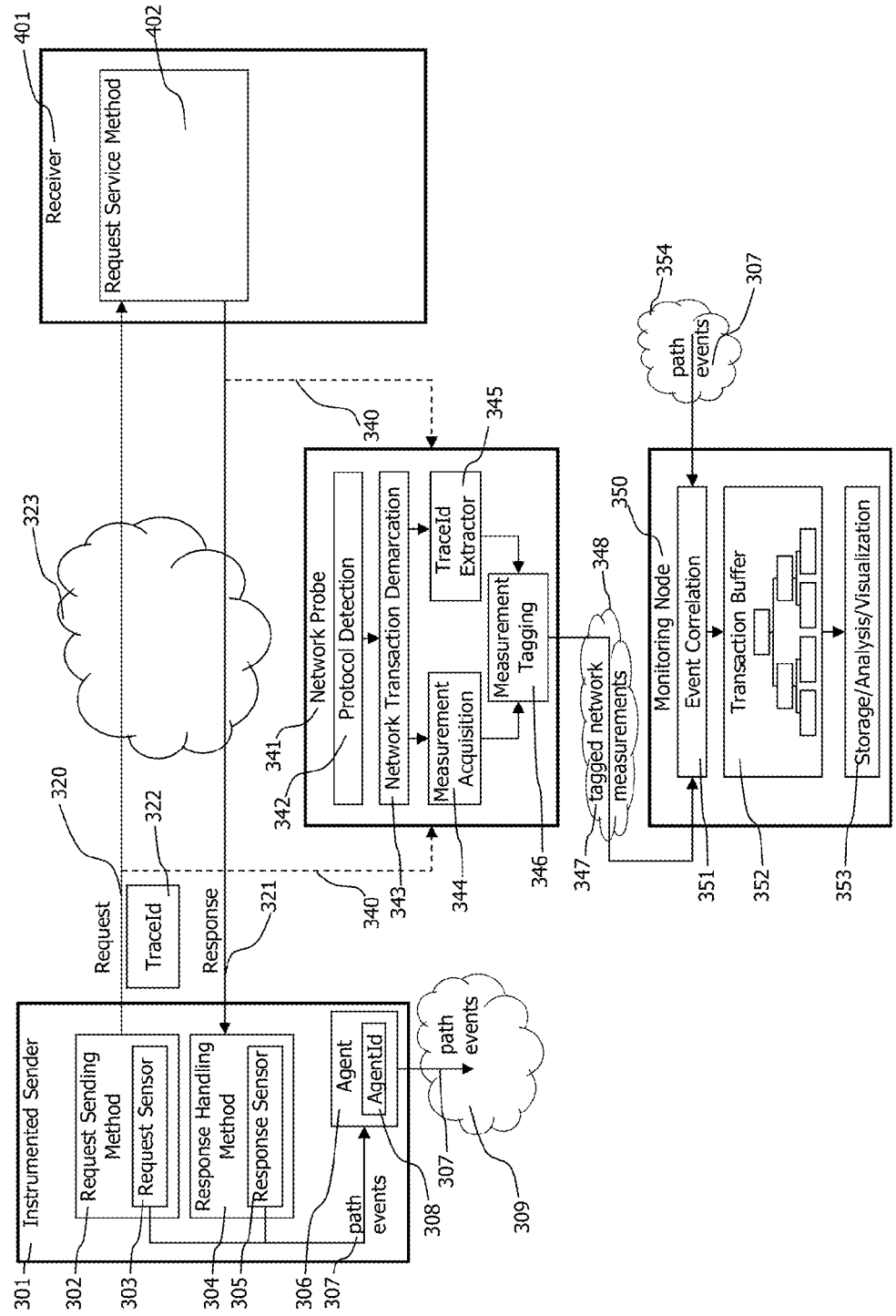
Figure 5:
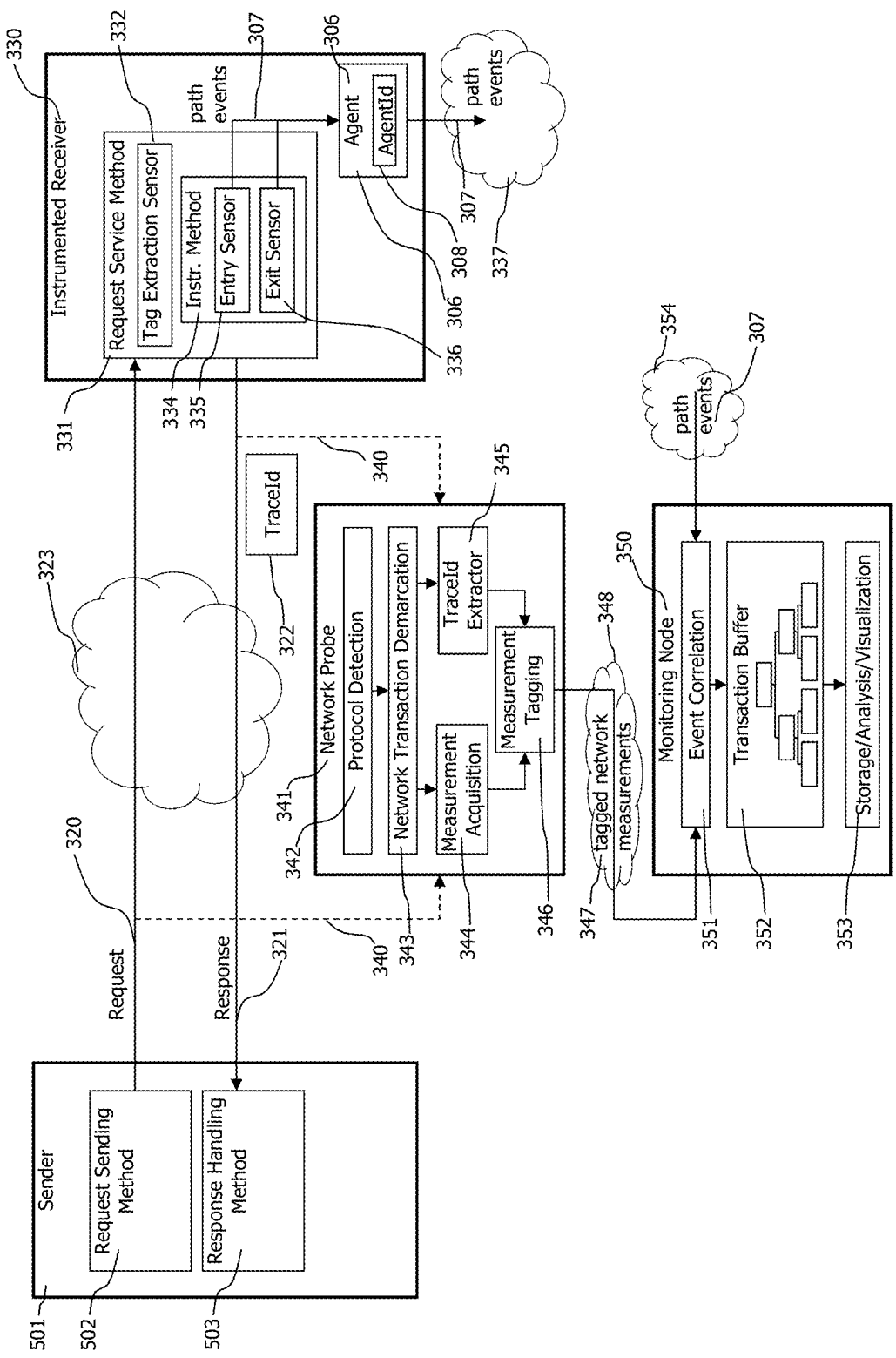
Figure 6:
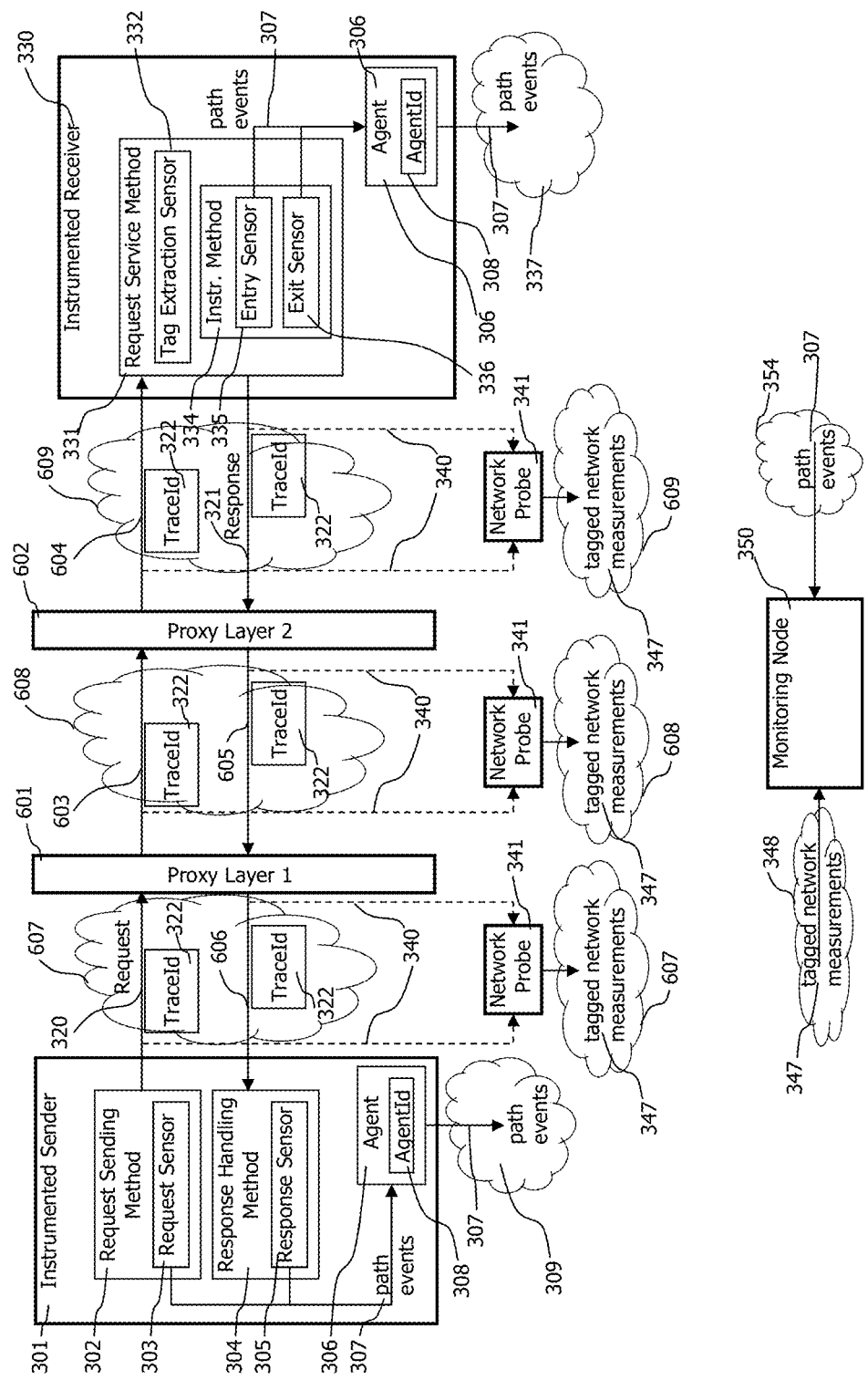
Figure 7:
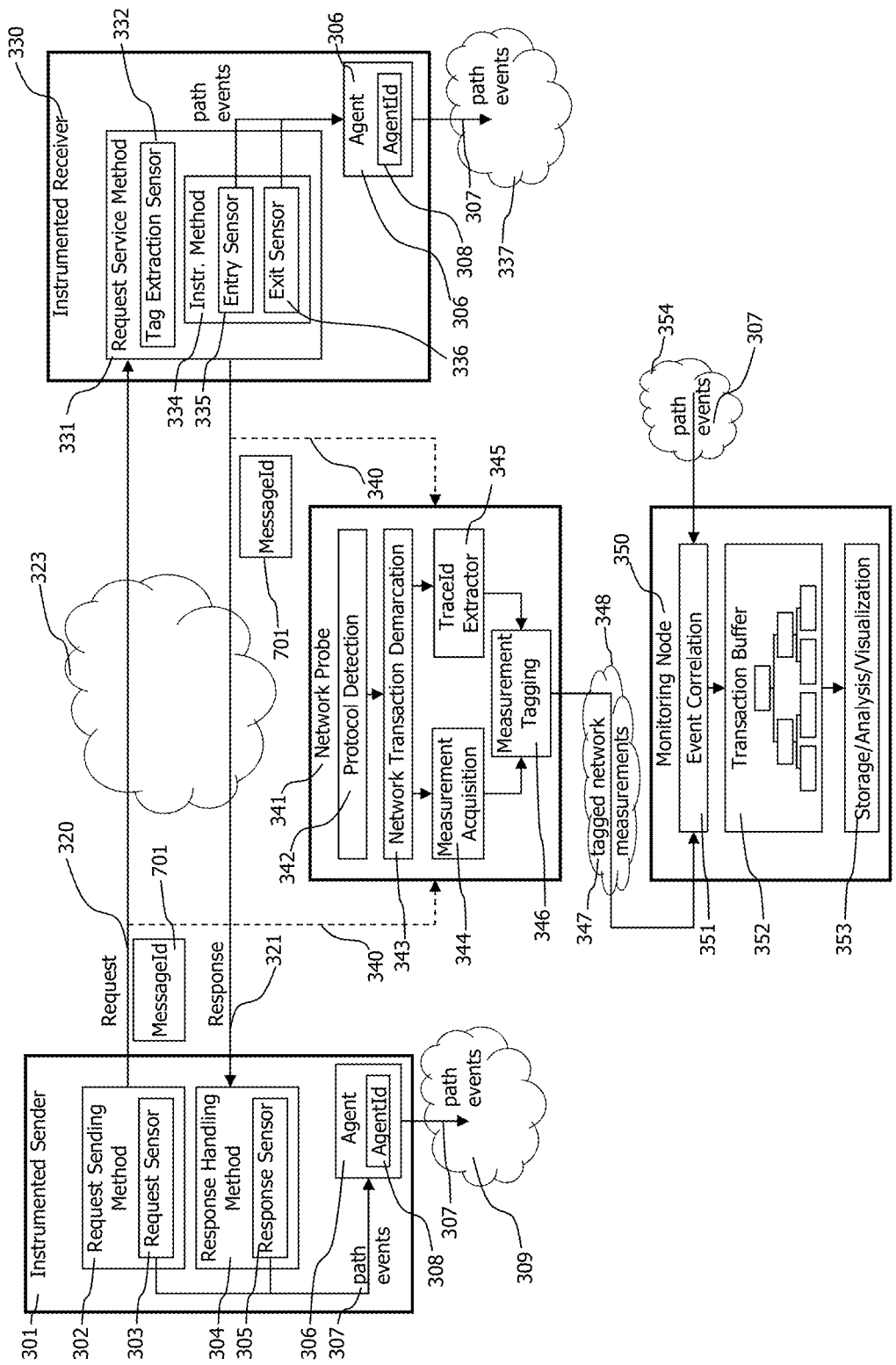
Figure 8:
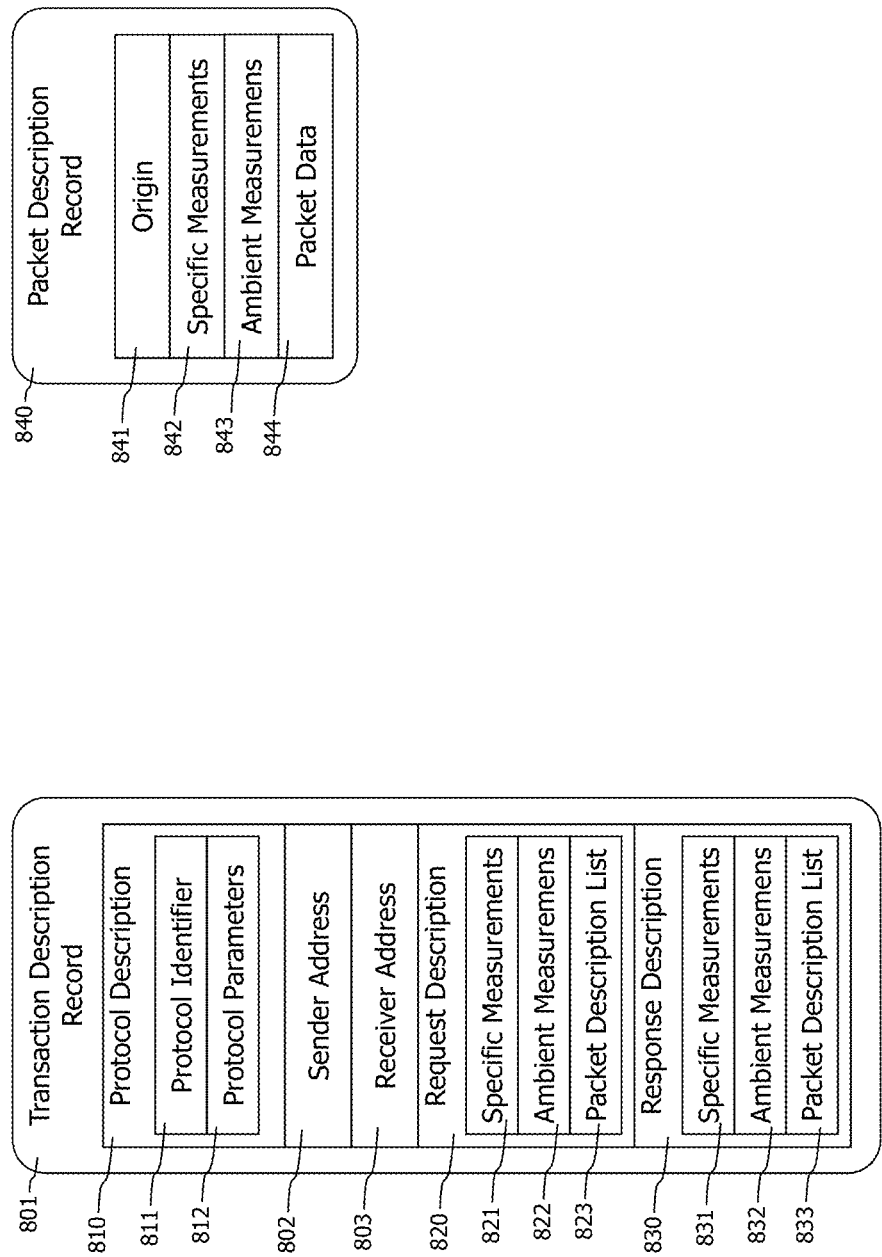
Figure 9:
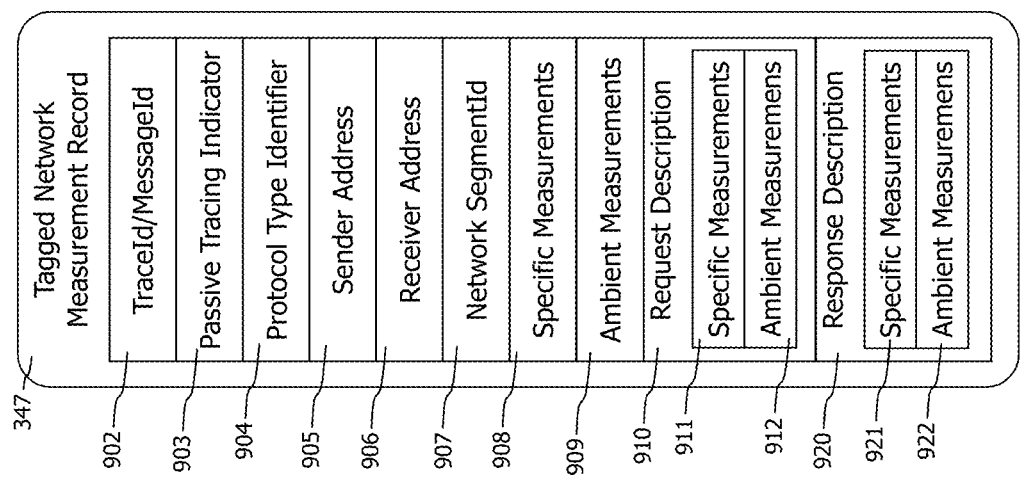
Figure 10:
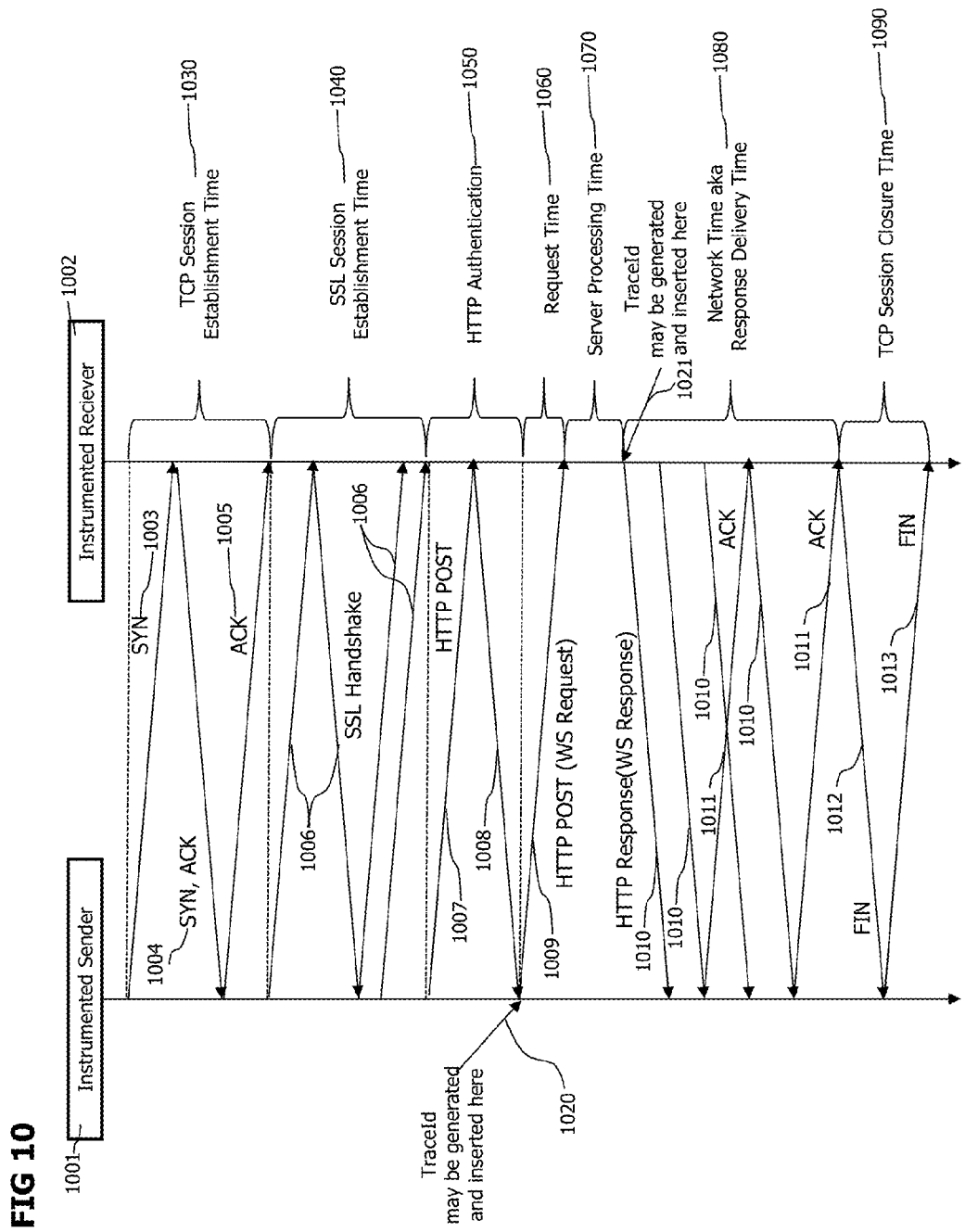
Figure 11:
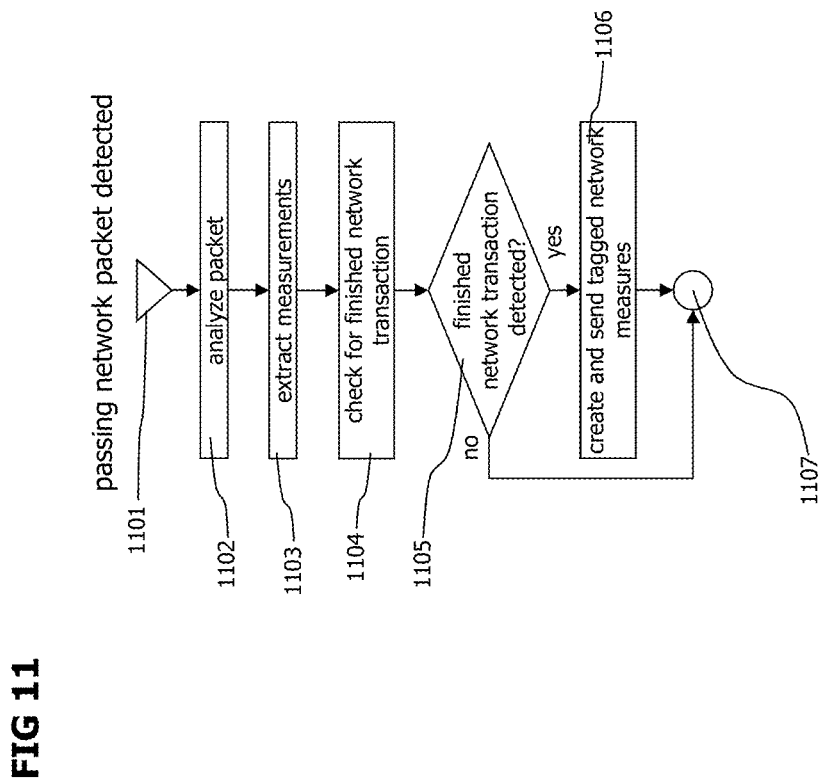
Figure 12:
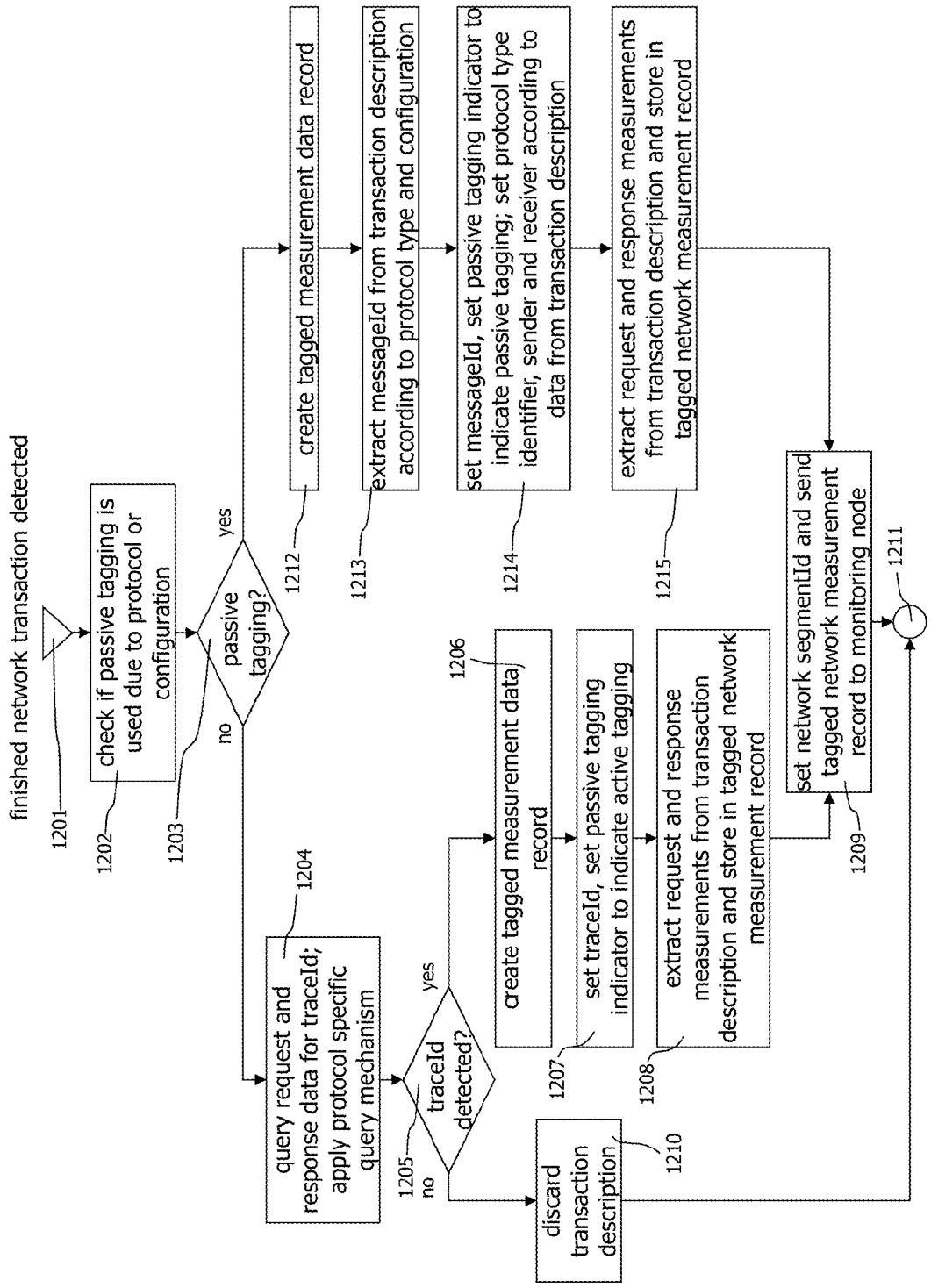
Figure 13:
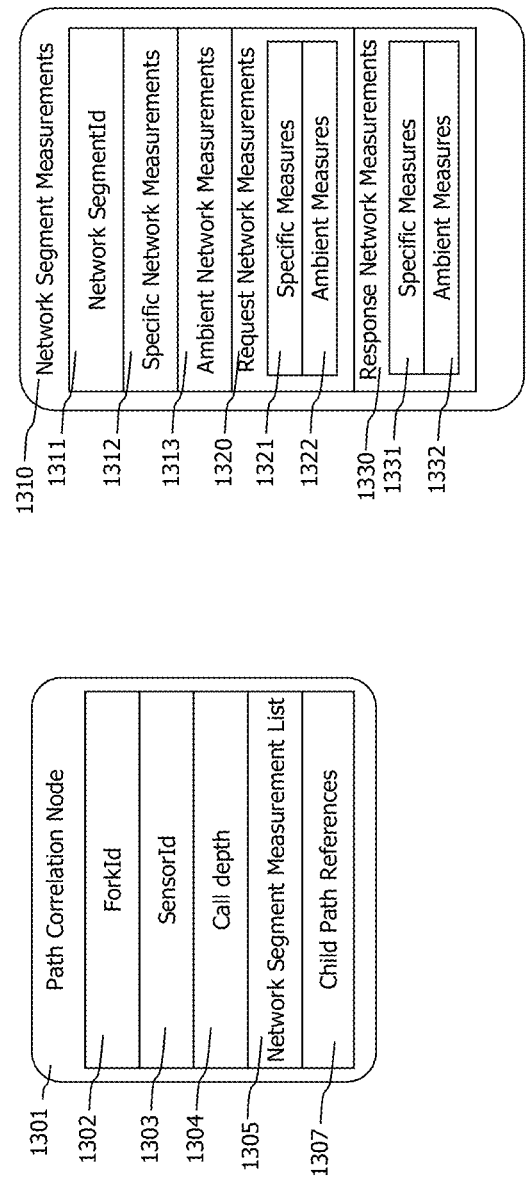
Figure 14:
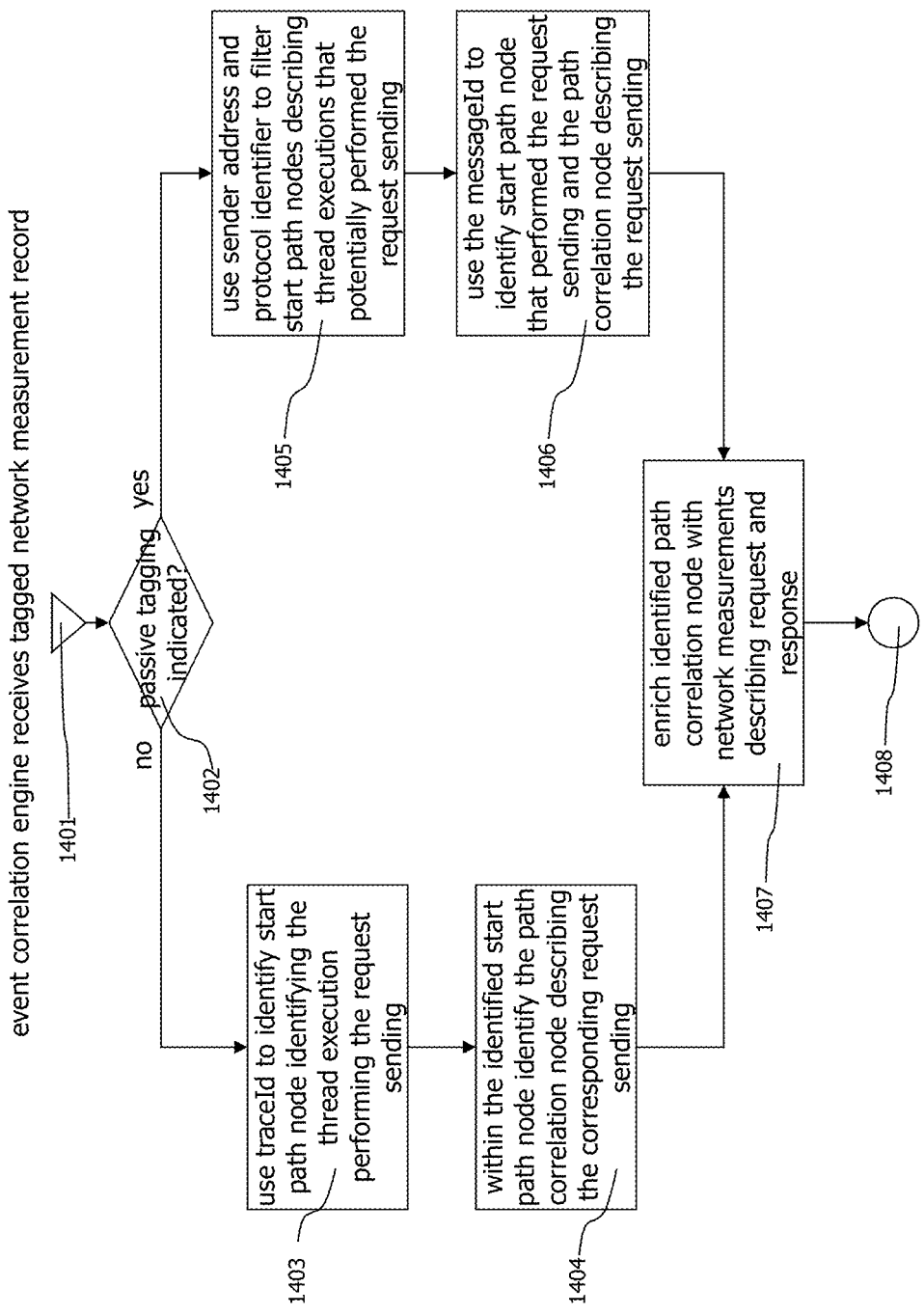
Figure 15:
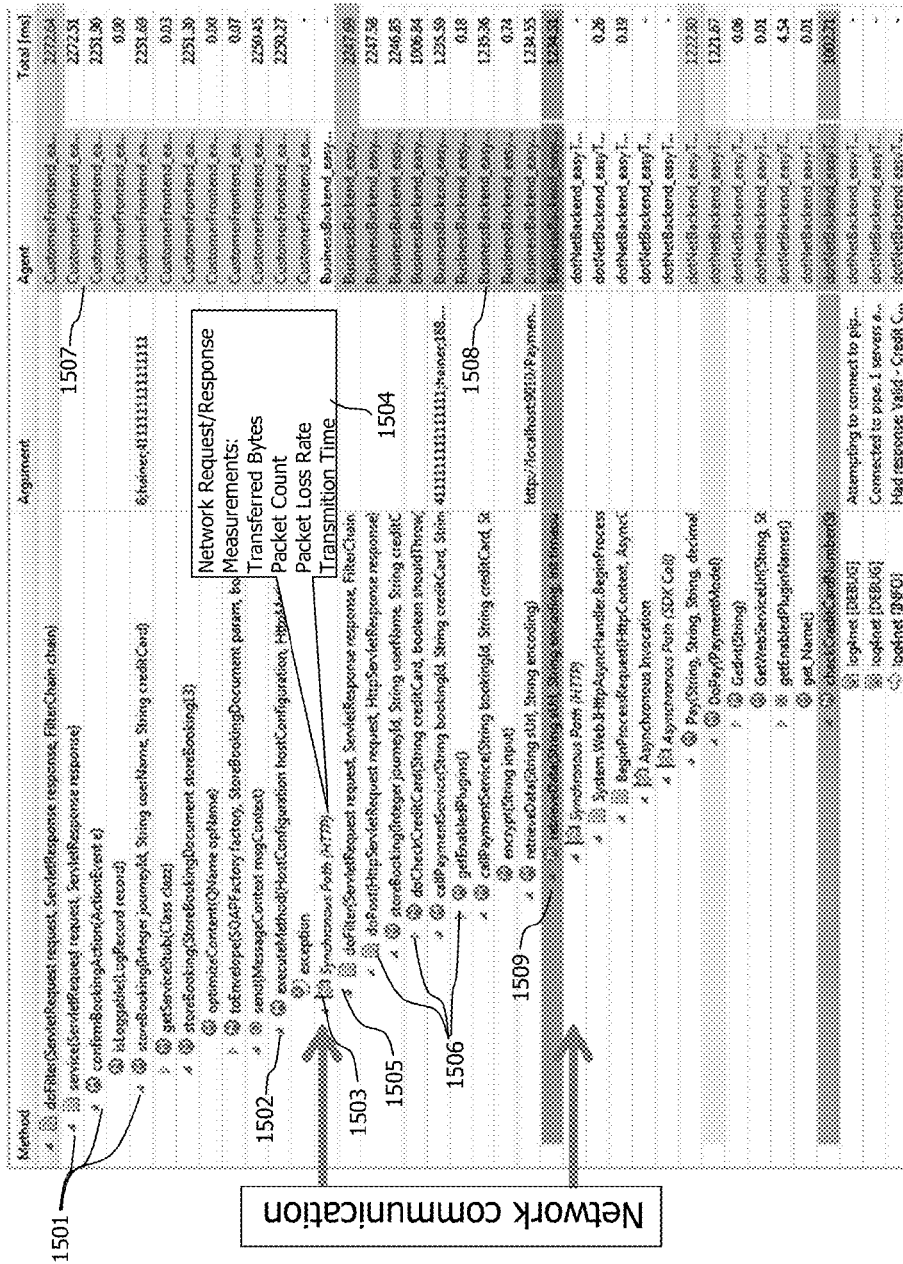
Figure 16:
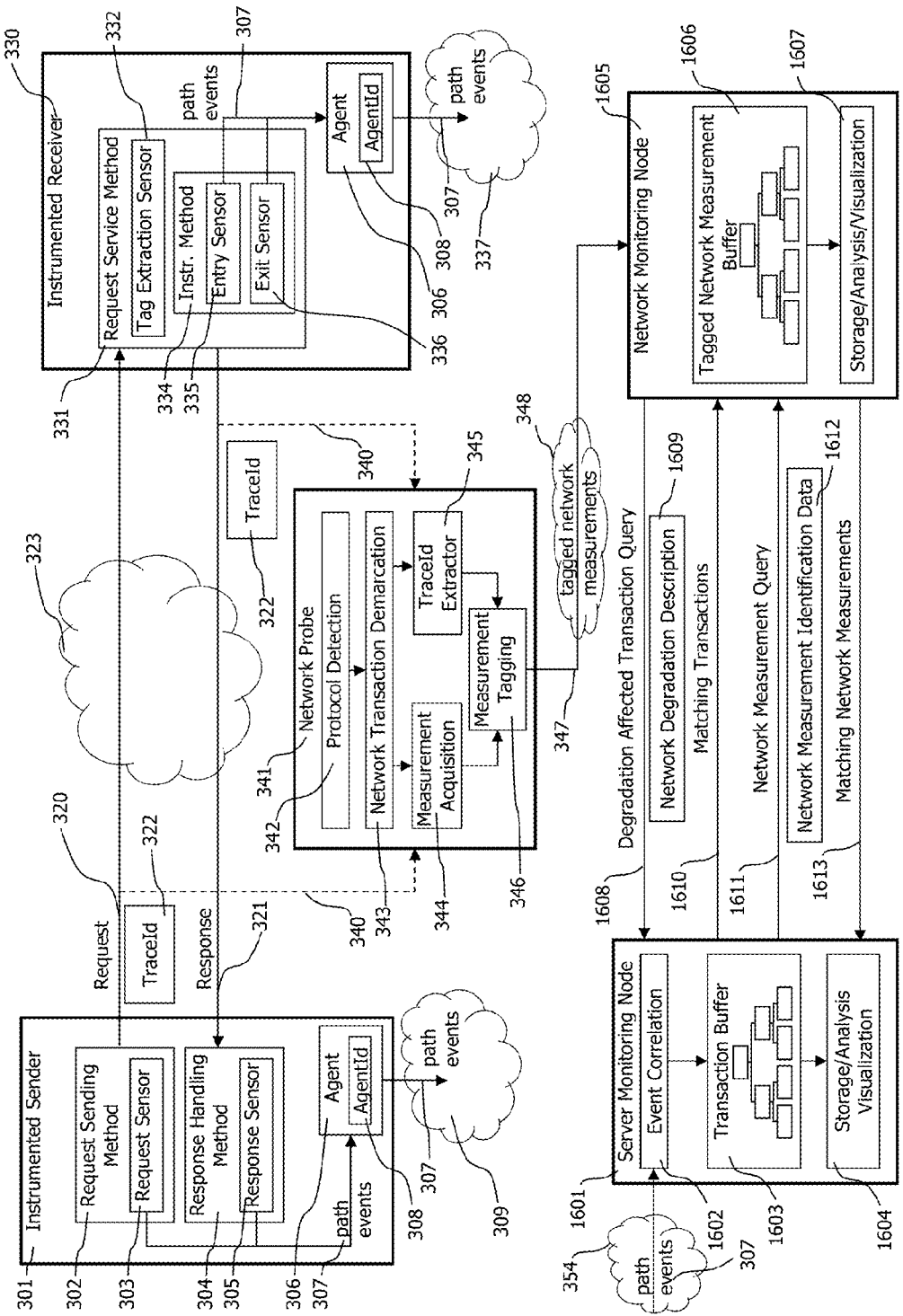

FIG. 4 depicts a monitoring system deployed to only monitor server side activities of the sender and network traffic caused by sending activities of the sender;

FIG. 5 shows a monitoring system configured to monitor a receiver and network traffic related to requests received by the monitored receiver;

FIG. 6 illustrates a situation where network communication between sender and receiver is routed over intermediate, not monitored network components with a deployed server side and network side monitoring system;

FIG. 7 shows a combined server side and network monitoring system deployed to a server/receiver pair using a communication protocol that does not allow adding of additional, synthetic correlation data;

FIG. 8 presents data records that may be used to store network transaction related measurement data internally at a network probe;

FIG. 9 shows a data record which may be used to transfer and store network measurements together with correlation data to identify corresponding server side transaction tracing data;

FIG. 10 shows network traffic caused by an individual network transaction using an exemplary "HTTP GET" request and the corresponding response;

FIG. 11 conceptually describes the processing of detected, bypassing network packets by a monitoring node;

FIG. 12 shows the process of extracting correlation data for the monitoring system out of network traffic data describing a specific network communication transaction, creating network measurement data together with correlation data to identify corresponding server side transaction tracing data, and sending the created measurement and correlation data to a monitoring node;

FIG. 13 shows a data record used to represent an individual network communication performed by a monitored transaction. The data record describes the server side aspects of a network transaction and is enriched with data fields describing network related measurements, relevant and specific for the described individual network transaction;

FIG. 14 conceptually shows the correlation process performed by the monitoring node that correlates server side tracing data describing network communications with corresponding network measurements;

FIG. 15 shows an exemplary visualization of combined server side and network side tracing data at the granularity level of individual transactions and network communications; and FIG. 16 presents a monitoring system that stores server side and network side tracing data and measurements separately, but which allows to identify corresponding network measurements for given server side transaction tracing data and vice versa on demand.

Figure 17:
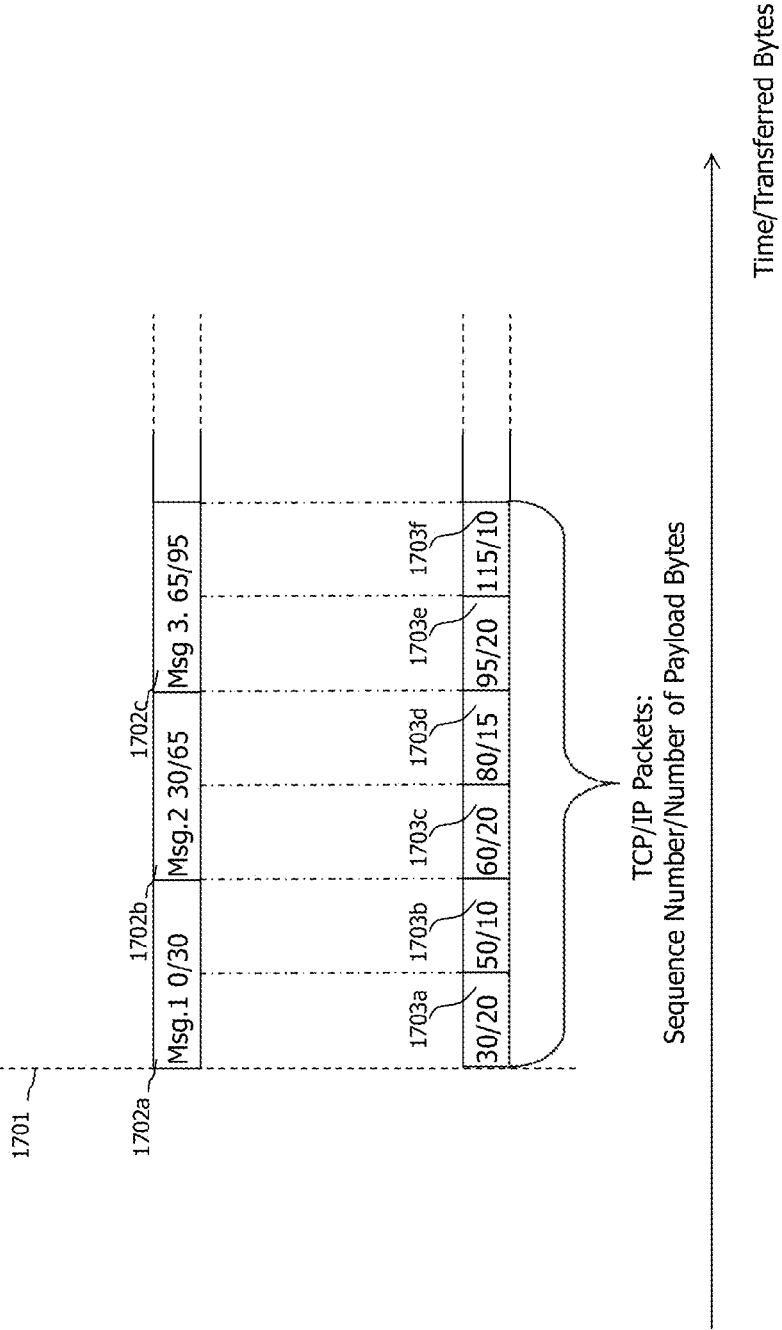
Figure 18:
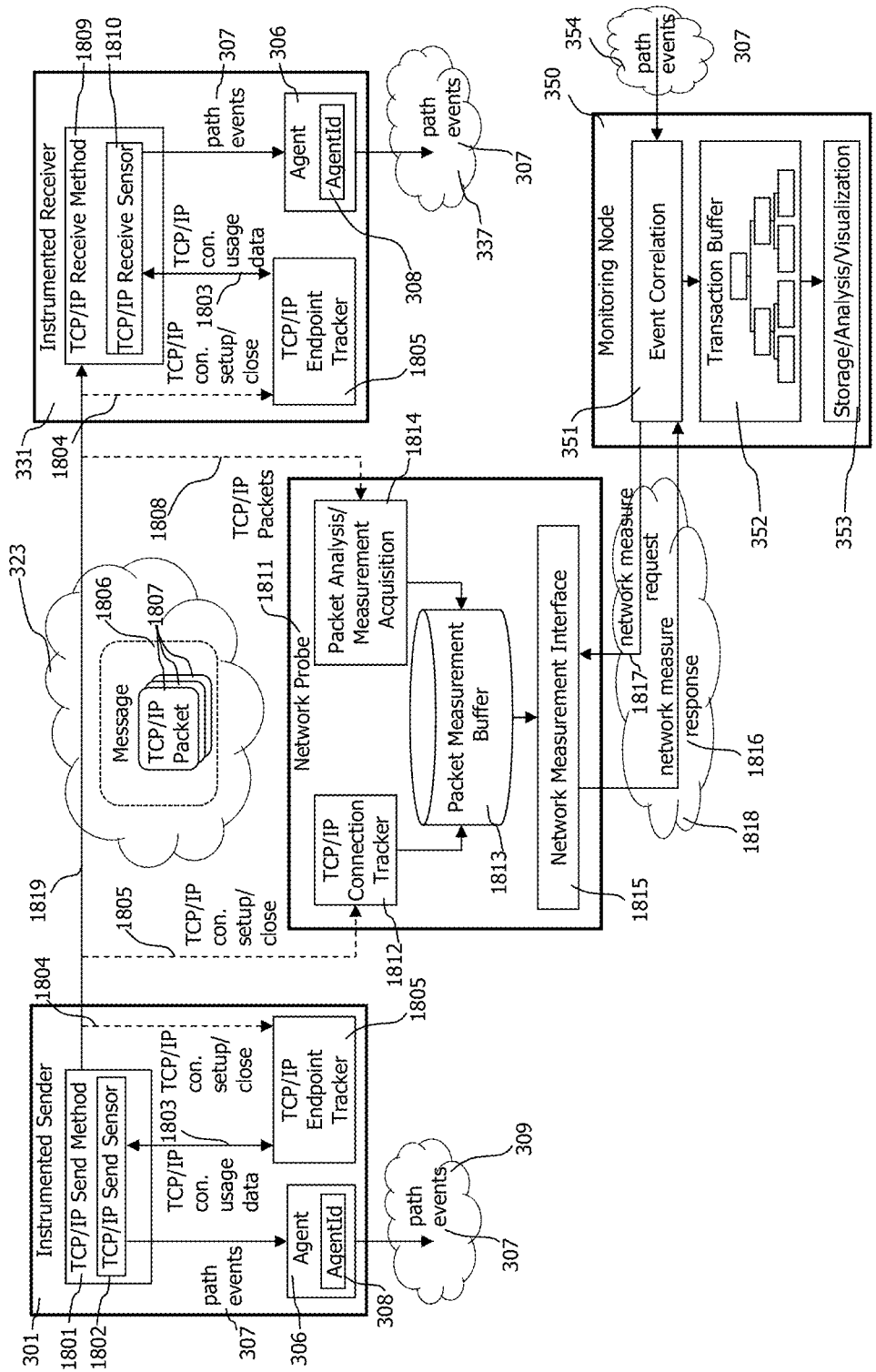

FIG. 17 illustrates the relation between the sequence numbers of TCP/IP packets sent over a TCP/IP connection and the number of transferred payload bytes;

FIG. 18 shows an overview of a monitoring system monitoring a part of a distributed transaction using an unknown application protocol to send a message over a TCP/IP connection;

FIGS. 19A-B describe data records used to store information about existing TCP/IP connections and corresponding usage data on both connection endpoints (sender and receiver) and in the network (network probe);

FIGS. 20A-D show processes performed by a TCP/IP endpoint tracker to keep track of established and closed TCP/IP connections and to record usage of those TCP/IP connections;

FIGS. 21A-B illustrate the execution of TCP/IP sensors on sender and receiver side to create correlation data capable to correlate matching sender and receiver parts and to identify corresponding network measurements describing the message transfer;

FIGS. 22A-B show processes performed by a TCP/IP connection tracker operated by a network node to track establishment and shutdown of TCP/IP connections and to capture the initial sequence number for new established connections.

FIGS. 23A-B describe the process of analyzing individual TCP/IP packets as performed by a network probe and a data record to store individual per TCP/IP packet measurements together with correlation data;

FIGS. 24A-C shows the process of correlating and combining transaction trace data describing the sender and receiver side of a distributed transaction that performed a communication using an application protocol unknown by the monitoring system with each other and enriching the combined correlation data with network monitoring data describing the network performance of the communication.

Figure 25:
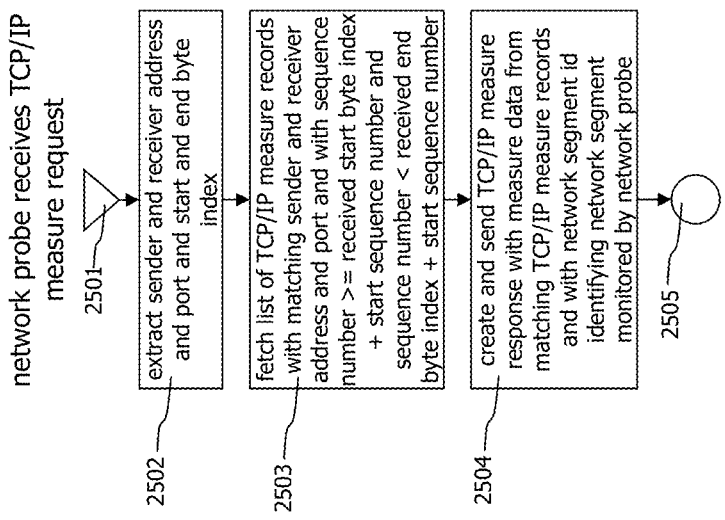

Additionally, data records to request communication specific network measurements from network probes are depicted;

FIG. 25 shows the processing of requests for per TCP/IP packet measurements for a specific communication as performed by a network probe.

Figure 26:
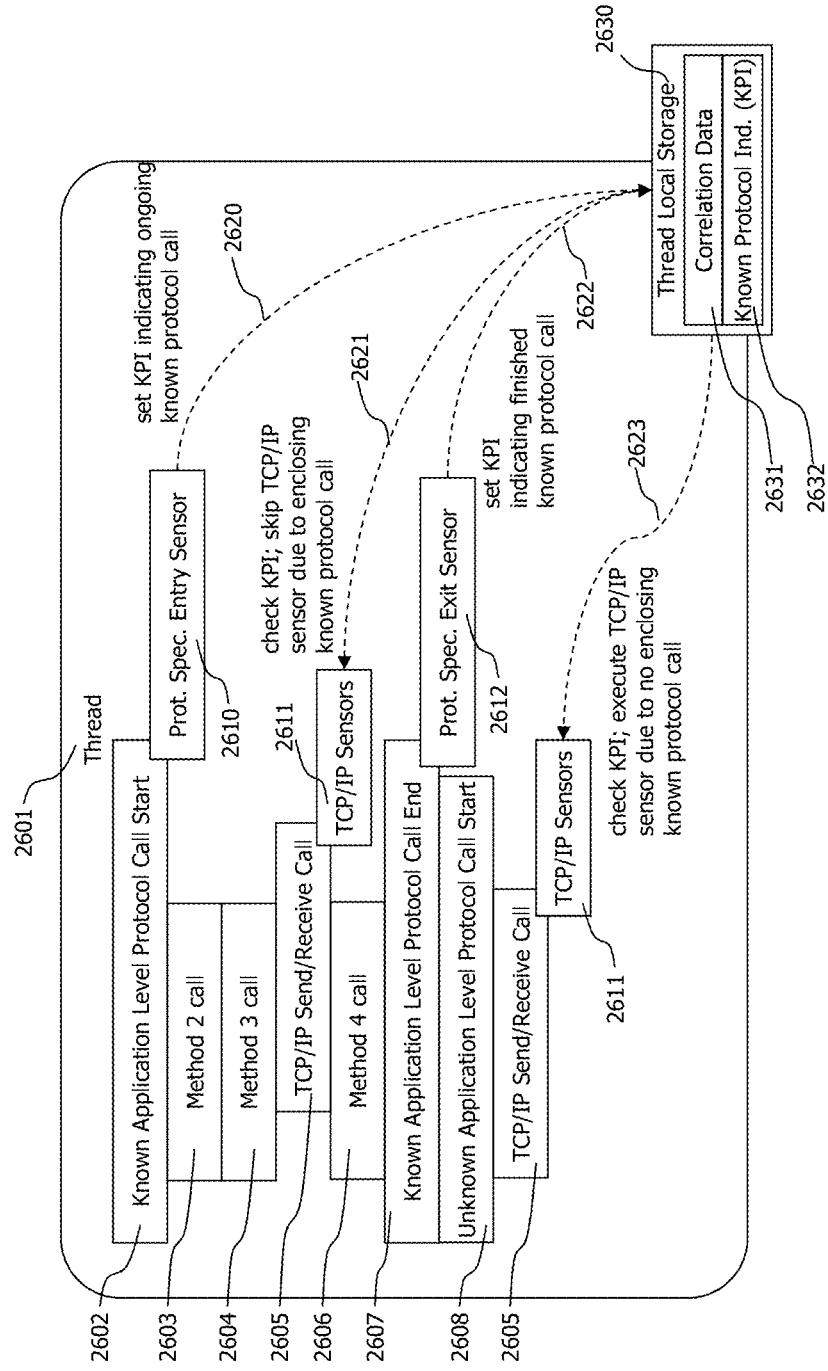

FIG. 26 depicts exemplary execution of communication using application protocols known and unknown to the monitoring system, together with interaction of application protocol specific and TCP/IP sensors to provide appropriate transaction tracing and correlation data on both cases.

Corresponding reference numerals indicate corresponding parts throughout the several views of the drawings.

DETAILED DESCRIPTION

Example embodiments will now be described more fully with reference to the accompanying drawings. The described embodiments are directed to monitoring systems capable to monitor both server side transaction processing, including initialization and servicing of network communications, and corresponding network side traffic on the granularity level of individual network communication events. The monitoring systems allow automated combination of server side tracing data describing the sending or receiving of a network message with the corresponding network measurements describing the network traffic caused by the network message and also describing the state of the used computer network during the transfer of the specific network message.

Network traffic describes activities performed by network components related to transport data between communication nodes. In terms of the ISO/OSI layer model, those are activities related to transport layer, network layer and below. The term "network activities" is used as synonym for network traffic.

A network communication transaction describes an individual communication event between two communicating computer nodes in the network. Typically such a network communication transaction contains a connection initialization phase, an optional connection securing phase, a request transferring phase, a response transferring phase and a connection teardown phase. A network communication transaction is triggered by an application to e.g. execute a distributed transaction and causes network traffic. Details of the network traffic related to the network communication transaction are not visible to the involved applications.

Variants of network communication transaction used to e.g. transfer messages from a sender to a receiver, may not contain a response part that transfers data back to the sender. A connection established to perform a network communication transaction may either be removed after the transaction is finished, or it may be reused for subsequent network communication transactions.

Server side activity describes processing related to e.g. execute a distributed transaction which is performed on a computer system executing an application or service provider component. Server side activity may at some points in time trigger network communication transactions.

A distributed transaction is executed as collaborative work of multiple application or service provider components potentially running on different computer systems, using interconnecting computer networks for communication. Execution performance of a distributed transaction may be impacted by conditions local to one involved computer systems, or by conditions of an interconnecting computer networks used for communication.

An application component is a computer program running on a computer system, providing functionality of an application required to execute distributed transaction. Examples of application components are Java™ programs running on a Java™ virtual machine. Service provider component is a synonym for application component.

Figure 1:
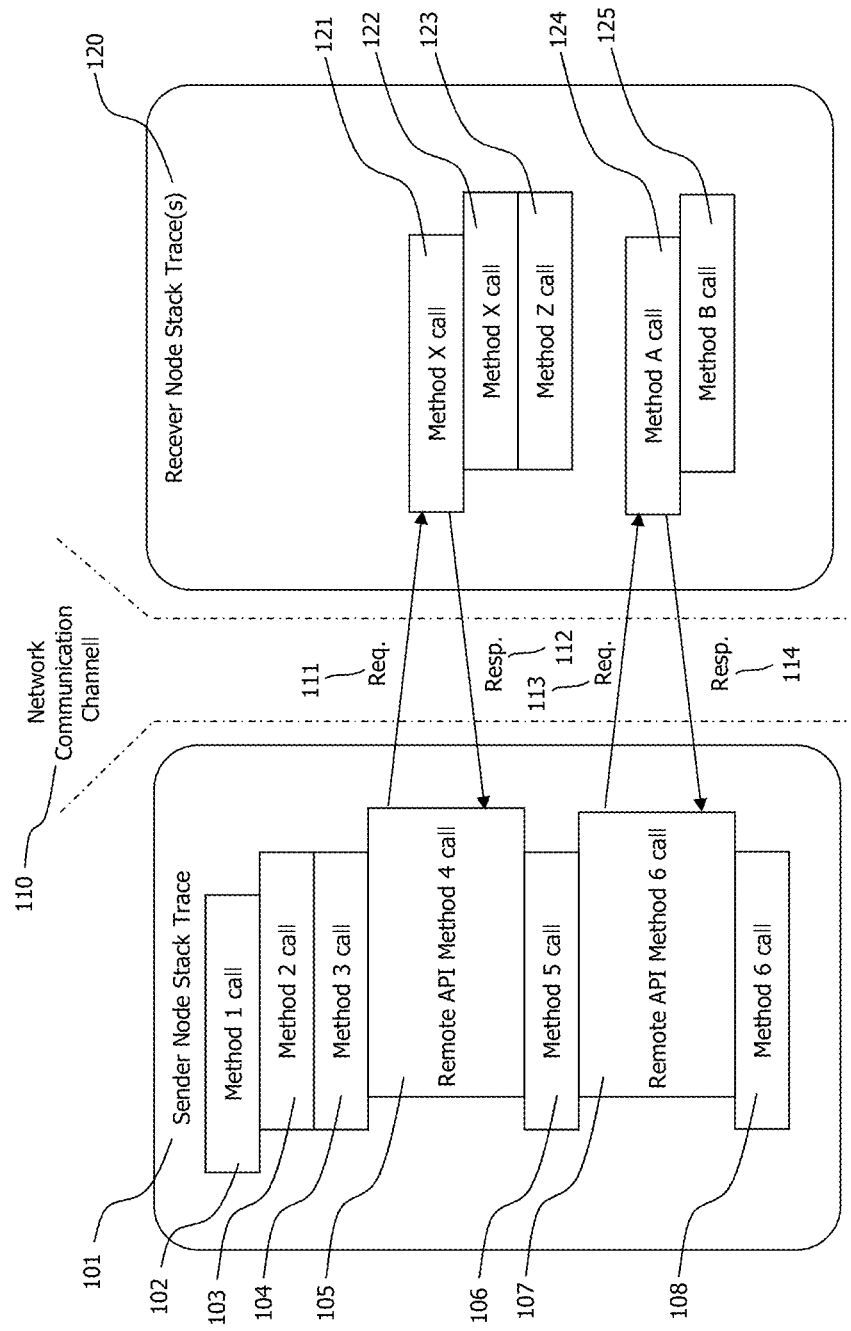
FIG. 1 shows exemplary network communications as seen from the application perspective.

Referring to FIG. 1, an exemplary execution of a distributed transaction is shown, containing network communications between a sender node and a receiver node. At the sender node, the execution of the monitored transaction produces a method call sequence in which an initial call to method 1 102 first executes method 2 103 and afterwards calls method 3 104, which nested performs a first remote method API call 105. The remote method API call sends a request 111 over a network communication channel 110 to the receiver node. Afterwards, it suspends the sender side transaction execution and waits until it receives a response from the receiver of the request.

At the receiver node, the request is received and triggers method call X 121 which performs the nested method calls X 122 and Y 123 to create the requested response. Afterwards, the response 112 is sent back to the sender node, and execution of the transaction at the sender application continues with method call 5 106 to e.g. process the received response. Additionally, method call 5 106 performs the remote API method call 6 107 which sends another request 113 to the receiver node and waits for the corresponding response.

On the receiver node, the request is received and triggers method call A 124 which in turn calls method B 125 to create the requested response. Afterwards, the created response 114 is sent back to the sender node.

On the sender node, the remote API method call 6 107 receives the expected response and processing continues with method call 6 108 to process the second received result.

The above description shows sender/receive communication from the perspective of the application, in which details of network communication are handled by underlying service layers. The inherent complexity of network communication is hidden from the communicating sender and receiver nodes.

Figure 2:
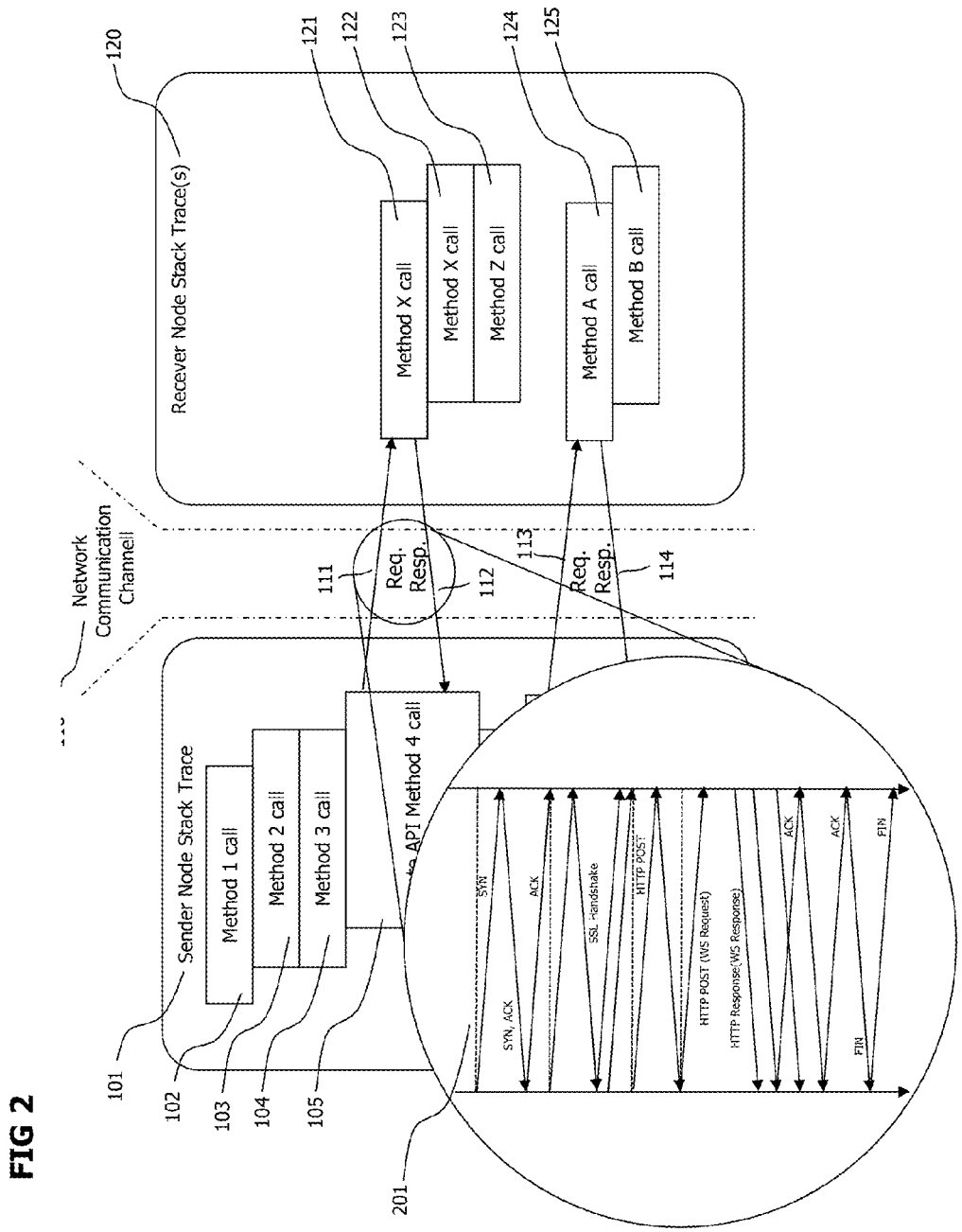
FIG. 2 shows detailed network activities required to perform an individual network communication in contrast to the abstract application view of the network communication.

To illustrate the amount of hidden complexity, referring now to FIG. 2, which shows the same communication sequence, but also shows network activity related to a single request/response pair in detail view 201. Purpose of the detail view is to show the amount of complex network related activity which is required to perform a relatively simple communication task from the application perspective. The detail view shows fundamental parts of a network transaction, like connection setup, connection securing, transfer of request and response and final connection teardown. For a detailed description of those steps please see FIG. 10. It is noteworthy that the shown network activities do not include tasks to handle unexpected events, like corrupt data or lost packets. Network components and service routines are typically capable to handle such unexpected events at the cost of temporarily increased network traffic which might e.g. cause performance degradations. This emphasizes the importance of visibility to network related activities for performance monitoring systems. It also shows that sever side and network side activities are tightly interwoven, and a performance monitoring system can only correctly provide information about the overall performance situation of an application if it considers and combines both aspects.

FIG. 3 shows a fragment of a monitored application consisting in a sender 301 and a receiver 330 component which are connected by a computer network 323. An agent 308 is deployed to both components. Each agent is configured with an agentId 308 which uniquely identifies the agent instance and the application component it is deployed to. The agents place sensors, like request sensors 303, response sensors 305, tag extraction sensors 332, entry sensors 335 and exit sensors 336 to appropriate methods of the applications. Those sensors detect events like sending/receiving requests or responses, entry or exit of instrumented methods and report them to the agent in form of path events 307. The agents 306 forward the received path events 307 to a monitoring node 350 for correlation, using a connecting computer network 309 or 337.

The sender component 301 executes a request sending method 302 which triggers the execution of a request sensor 303 that reports the request sending to the agent 306 in form of path events 307. Additionally, it adds correlation data in form of a traceId 322 to the request 320 which is sent to the receiver 330. The data stored in the traceId must be sufficient to identify the specific method execution that performed the request sending. It may contain but is not limited to an agentId, identifying the sender component, a pathId, identifying the thread execution that performed the request sending, and a forkId identifying the specific request sending method execution that sent the request. The request 320 containing the traceId 322 is sent to the receiver 330 via a connecting computer network 323 and is recognized by a network probe 341 which is deployed to the network 323 connecting sender and receiver component. The receiver handles the incoming request in a request service method 331, which triggers the execution of an injected tag extraction sensor 332. The tag extraction sensor extracts the identification data from the traceId 322 received with the request 320 and makes it available for subsequent sensor executions by the current execution thread, e.g. by storing the traceId data in thread local variables. The request service method 331 calls an instrumented method 334 with an injected entry sensor 335 and exit sensor 336 to create the requested result. Entry and exit sensor report a new monitored thread execution, triggered by an activity in a parent thread identified by the extracted traceId data to the agent. Afterwards, either the exit sensor 336 or a specialized response sending sensor inserts a traceId containing the data received with the request to the created response and the response 321 is sent to the sender. At the sender, the response is received and handled by an instrumented response handling method 304 which processes the response and also calls the injected response sensor 305 which reports a received response to the agent in form of path events 307. The agents deployed to sender 301 and receiver 330 forward the received path events 307 to a monitoring node 350 for correlation.

Network probes may be placed at different locations in the network being monitored. A network probe 341 monitors data packets traversing through the network and computes metrics indicative of network performance. More specifically, the deployed network probe 341 reads transferred network data 340, analyzes bypassing network traffic and reconstructs network transactions realized by the network traffic using a protocol detection unit 342 and a network transaction demarcation unit 343. This allows the network probe to reconstruct the signature of the sent and received data at the application level. In case of a network communication transaction based on HTTP, it would be able to reconstruct the structure of a transferred HTTP request and to identify and extract header fields and values of this request. Such header fields and values of the HTTP request may e.g. be used to add tradeId 322 data to a request.

Network measurements relevant for the detected network transactions are extracted in the measurement acquisition unit 344 and transaction correlation data required to identify matching sender and receiver parts of a distributed transaction are extracted in the traceId extractor unit 345. The transaction correlation data may be available in form of a traceId 322. The measurement tagging unit consumes both extracted measurements and correlation data and creates corresponding tagged network measurements 347 which are sent to the monitoring node 350 via a connecting computer network 348. Network Vantage software available with Compuware's Vantage product offering is an example of a network probe which may be used in this context.

Alternatively, network probes as described herein may also be implemented as software component deployed to computer systems running the instrumented sender 301 and/or the instrumented receiver 331. Such software components would have to monitor low level activity of the network interfaces of the computer systems they are deployed to, to gain information about sent, received and passing network packets. Such a pure software based version of a network probe would e.g. allow tighter interaction with agents 306 deployed to the monitored sender 301 and receiver 331 applications. As an example, an agent 306 may in response to receiving a path event 307 indicating a network communication, like sending or receiving a request or a response, contact the software implemented network probe deployed to the same host as the agent and request network measurements relevant for the network communication and enrich the path event 307 with those network measurements. This could reduce the efforts required to monitor the network activity by removing the need to install a separate network appliance, and could additionally reduce the load of the event correlation 351, because a centralized correlation of network measures with transaction measures is no longer needed.

The event correlation unit 351 of the monitoring node 350 receives and processes both path events 307 and tagged network measurements 347 to create end-to-end transaction tracing data enriched with corresponding network measurement data. Path events are used to build the server side tracing data, including trace link elements (e.g. extended path correlation nodes 1301) describing network communications between different threads involved in the described transaction executions. Data from corresponding tagged network measurements (i.e. matching agentId, pathId and forkId) is used to enrich the trace link elements with network measurements relevant for the described network communication. Tracing data is stored in a transaction buffer 352, from which it is accessed by storage, analysis and visualization modules 353 for further processing. It is noteworthy that tagged network measurements and path events may arrive at the event correlation engine in arbitrary order. To address this problem, the event correlation engine may e.g. store tagged network measurements in an intermediate buffer if path events describing the corresponding network transaction did not yet arrive at the event correlation unit 351.

A situation where only the sender part of the execution chain of a distributed transaction is instrumented is shown in FIG. 4. An instrumented sender 301 sends a request 320 with injected traceId 322 to a not instrumented receiver 401, which handles the request in a request service method 402 and returns a corresponding response to the sender. Note that as the receiver is not instrumented with sensors to report method executions and to manipulate the response 321. As a consequence, no traceId is injected to the response.

The protocol detection unit 342 and the network transaction demarcation unit 343 of the network probe identify the network transaction by analyzing the bypassing network packets. The network probe 341 extracts the traceId 322 from the identified network transaction and creates and sends tagged network measures to the monitoring node 350 as described above. As the whole network transaction is identified and isolated, the traceId can either be extracted from the request part or from the response part. As a consequence, the described methods for combining server side and network side tracing data also work if only one out of the sender and receiver nodes is instrumented.

Agent, request sensor and response sensor of the instrumented sender also create and forward path events as described above.

The event correlation 351 would receive the path events from the sender component 301 and create transaction tracing data describing the server side of the monitored distributed transaction. It may, by analyzing incoming path events detect that the request 320 was sent to a not monitored receiver and would mark the tracing data fragment describing this request as outgoing communication, according to the teachings of patent U.S. patent application Ser. No. 13/560,153 entitled "Method And System For Tracing Individual Transactions At The Granularity Level Of Method Calls Throughout Distributed Heterogeneous Applications Without Source Code Modifications Including The Detection Of Outgoing Requests", which is incorporated in its entirety herein by reference.

On receiving of the tagged network measurements 347 describing the network view of the transaction, the tracing data is enriched with network specific measures as described above. It is noteworthy that the network measurements contain also measures describing the response, because the network probe is capable to identify corresponding request response pairs without synthetic tracing data.

The opposite situation to FIG. 4 is depicted in FIG. 5, which describes a situation with a not instrumented sender 501 and an instrumented receiver 330. Processing and monitoring of server side transaction execution at the receiver is as described in FIG. 3.

The network probe will in this situation use the traceId 322 contained in the response 322 injected by a sensor of the instrumented receiver to create corresponding tagged network measurements 347. As described in FIG. 4, network measurements for the whole network transaction, also including the not tagged request are available and will be combined with server side transaction tracing data. For network communication transaction variants containing no response data visible at the application layer, like network communication transactions used to transfer messages or notifications from a sender to a receiver, an active tagging mechanism which relies on response data which is enriched with tradeId 322 data does not work. In such situations, a passive tagging approach as described later in FIG. 7 may be used.

A more complex computer network connection between sender and receiver is shown in FIG. 6. In this setup, the network traffic is routed over two proxy components 601 and 602. Such intermediate network components might be necessary for e.g. security or network reasons. From a network perspective, they copy incoming network traffic from one network segment to another. The additional functionality of those components is not relevant for the present invention and is omitted here to not distract the reader from the core concepts of the disclosure.

The sender component 301 is connected to network segment 607, which is connected to network segment 608 by proxy layer 1 601. Network segment 608 is connected to network segment 609 via proxy layer 2 602. In FIG. 5, a network probe 341 is installed in each network segment to monitor the network traffic of the segment, to identify network transactions, to extract traceIds 322 from network transactions and to create and send tagged network measurements 347. It would be possible to e.g. install network probes only to portion of the involved network segments, or to use a single network probe capable to monitor multiple network segments without leaving the spirit and scope of the current disclosure.

A request 320 sent by the sender 301 to network segment 607 is transmitted to network segment 608 by proxy layer 601 and afterwards by proxy layer 602 into network segment 609 until it reaches the receiver 330. The response generated by the receiver travels the same way back. The injected traceId 322 is also transferred by the proxy layers to the different network segments, which allows the deployed network probes 341 to create corresponding tagged network measurements 347 for each network segment. The combination of server side tracing data with network measurements as performed by the event correlation may in this case either create aggregated measurements describing an average of the network measurements of each passed segment, or it may store different measurements for each segment, depending on the desired network visibility level. Tagged network measurements 347, may contain a network segmentId 907, which identifies network segment to which the tagged network measurement relates. The network probe 341 may, in a deployment where an individual network probe is deployed to each network segment, use a configuration parameter which uniquely identifies the network probe and thus the network segment it is deployed to as network segmentId 907. In case e.g. one network probe monitors multiple network segments, an identification parameter for each monitored network segment, like an IP network address, or an IP network address and an IP subnet address, which uniquely identify a network segment may be fetched by the network probe for each monitored network segment, and then used as network segmentId 907.

The segmentation may be performed either by the topological configuration of the computer network, which may be identical to devices used to build it (e.g. L2 switches) or by using concepts like virtual local area networks (VLAN) to subdivide different network segments, or on application logic level, by separating network connections according to the functionality performed by the communicating entities. Connections between computing systems performing presentation layer functionality may e.g. be associated to another application logical segment than communication performed to execute backend tasks.

The network probes may use either network topology, application logical segmentation or a combination of both to identify a network segment. An identifying network segmentId may either be derived from communication endpoints (application logic level) or from the network infrastructure (switch name or network probe name responsible for monitoring specific part of the infrastructure or in case of VLAN based segmentation, the name or id of the monitored VLAN).

Tagged network measurements 347, may contain a network segmentId 907, which identifies network segment to which the tagged network measurement relates. The network probe 341 may, in a deployment where an individual network probe is deployed to each network segment, use a configuration parameter which uniquely identifies the network probe and thus the network segment it is deployed to as network segmentId 907.

In case e.g. one network probe monitors multiple network segments, an identification parameter for each monitored network segment, like an IP network address, or an IP network address and an IP subnet address, which uniquely identify a network segment may be fetched by the network probe for each monitored network segment, and then used as network segmentId 907.

FIG. 7 shows instrumented sender 301 and receiver 330 using a communication protocol that does not allow a manipulation of requests 320 or responses 321 by injected sensors to e.g. add a traceId 322. In this case, the combined monitoring system may use "natural" correlation data already available in request or response like e.g. a messageId 701 to correlate corresponding sender and receiver parts of a specific distributed transaction. This correlation may be performed according to the teachings of U.S. patent application Ser. No. 14/085,882 entitled "Method and System for Tracing Individual Transactions over Messaging Systems without Adding Tracing Information to Messages", which is included in its entirety herein by reference. As the protocol detection 342 and network transaction demarcation unit 343 of the network probe 341 are capable to identify and isolated network transaction and to extract the messageId according to the detected protocol type, the described method also works if only one of sender and receiver is instrumented.

In case of a situation with a not instrumented sender, both network probe and instrumented receiver can extract the messageId, and the server side tracing data describing the incoming communication can be correlated with the corresponding network monitoring measures. Same applies for a not instrumented receiver, in which case server side tracing data describing the sending of an outgoing communication is combined with corresponding network measurement data.

The network probe 341 may either decide based on the detected protocol type, or based on configuration settings if the traceId extractor 345 extracts a synthetic traceId 322 or a messageId 701 from a detected network transaction. In case a messageId is extracted and used to tag network measurements describing a network transaction, the measurement tagging unit might add additional data to the created tagged network measurements record, like e.g. a protocol type, that allow the event correlation unit 351 to interpret the messageId 701 correctly during the combination of server side tracing data and network measurements.

In cases where the application level protocol used for the communication is not known by the monitoring system, and the only extractable information about a performed communication are an indicator that the communication was performed, and the number of bytes sent or received during the communication, indicators on the network transport level, like the sequence number in the header of TCP packets may be used to correlate server side tracing data of sender and receiver and to combine the correlated tracing data with corresponding network measurements. This approach may also be used in case of a known application protocol which does not allow adding of synthetic correlation information by a monitoring system, and which also does not allow to extract reliable natural correlation data in form of messageIds to identify an individual network communication transaction.

The TCP sequence number can be considered as an index number of bytes sent over a specific network connection. In case a sender 301 or receiver 330 are started and send a first request or return a first response over a specific network connection, they initialize a byte counter for the specific network connection, and increment this counter with every byte sent over the specific network connection. Before the sender sends a request, it fetches the current byte count for the used connection and stores it to a path event 307 indicating the sending of the request together with data identifying sender and receiver endpoints of the used network connection, like IP addresses and ports used by sender and receiver. The sender byte count is then incremented with every sent byte.

At the receiver application, the byte count of the receiver is fetched on an indicated incoming request and added to a path event 307 indicating the received response, together with connection endpoint identification data. The byte counter is incremented with each received byte.

The event correlation unit 351 may use received byte counts and connection endpoint identification data from sender and receiver to identify and combine matching tracing data fragments from sender and receiver.

The network probe 341 detects when a network connection is initiated, stores the current TCP sequence number and sends it, together with data to identify the two processes or software components using the established connection to the monitoring node 350. This identification data may contain but is not limited to the IP address and port identifying the sender and receiver endpoints of the used network connection. The monitoring node 350 may store this data as offset data between the byte count received via path events 307 from sender 301 or receiver 330 and the sequence number received from a network probe 341 via tagged network measurements. This offset data may be used during combination of server side tracing data with network measurements to calculate a corresponding byte count number for a given sequence number. If the byte count of tracing a data fragment describing the communication at the application level matches the byte count number calculated from the sequence number using the offset data and the communication endpoint identification data also matches server, then side tracing data and network measurements can be combined.

In case of a network connection disruption, like e.g. a temporary network outage or a restart of sender or receiver process, a new network connection is established between sender and receiver, the byte counts of sender and receiver are reset to 0 and the network probe calculates a new segment number offset.

The network infrastructure recognizes such reconnect situations and blocks the port numbers forces the new connection to use different port number on sender and receiver side. This network infrastructure inherent behavior guarantees that byte count or sequence number together with connection endpoint data is sufficient for correct correlation and combination even in a reconnect situation.

It is obvious for those skilled in the art that such a mechanism has to take e.g. parallel processing and using of network connections in e.g. different threads into account to keep the byte count consistent.

Additionally, this method can only be employed if sender and receiver are directly connected. In a connection configuration as e.g. depicted in FIG. 5, where network traffic is routed over intermediate nodes, an individual TCP connection is established in each network segment. Without an agent deployed to the intermediate nodes, an identification of corresponding ingoing and outgoing TCP connections at the intermediate nodes is not possible. A more detailed description of this TCP sequence number bases correlation can be found in FIGS. 17 to 25

Data records that may be used internally by a network probe 341 to temporarily represent monitored network transactions are shown in FIG. 8. A transaction description record 801 may be used to describe a monitored network transaction and a packet description record 840 may be used to describe a single network packet which is used to realize a network transaction together with other network packets.

A transaction description record 801 may contain but is not limited to a protocol description 810, which provides information about the protocol type in form of a protocol identifier 811 and information about protocol parameters 812, describing the specific used protocol in detail, a sender address 802 identifying the computer node and process that triggered the network transaction (e.g. containing IP number and port), a receiver address 803 identifying the computer node and process that services the request of the network transaction (e.g. containing IP number and port), a request description 820 and a response description 830. Request description 820 and response description 830 may contain but are not limited to specific measurements 821 and 831 containing measurements that describe the specific request or response, like number of transferred bytes, transferred packets, average packet transfer time, specific packet loss rate and network latency etc., ambient measurements 822 and 832 containing measurements describing the condition of the network infrastructure during execution of the network transaction, like average latency, overall bandwidth utilization or average packet failure rate, and a packet description list 823 and 833 containing descriptions of the packets that formed the described request or response in form of packet description records 840.

A packet description record 840 may contain but is not limited to an origin field 841, specifying the communication participant that sent the packet (e.g. sender or receiver), specific measurements 842 describing the packet and ambient measures describing the conditions of the network infrastructure during the transfer of the packet, and a packet data field, containing the data contained in the packet. The packet data may be required to extract a traceId or a messageId from a detected finished network transaction. If it is possible to extract traceId or messageId "on the fly", while the transaction is still ongoing, storage of packet data may be omitted.

Tagged network measurement data records 347, as described in FIG. 9 may be used to transfer measurement data describing individual network transactions monitored by a network probe 341 to a monitoring node 350 for correlation. A tagged network measurement record 347 may contain but is not limited to a traceId/messageId field 902 containing synthetic correlation data in case active tagging is used, or extracted existing message/network transaction identification data in case passive tagging is used, a passive tagging indicator 903 indicating the type of used tagging, a protocol type indicator 904 containing information about the protocol used by the described network transaction, a sender 905 and a receiver 906 address (e.g. IP number and port) identifying initiating and servicing communication partner of the network transaction, a network segmentId 907 identifying the network segment for which the measurements are valid, specific 908 and ambient 909 measurements describing the network transaction and the condition of the network infrastructure during transaction execution, a request description 910 and a response description 920. Request description 910 and response description 920 may contain but are not limited to specific measurements 911 and 921, and ambient measurements 912 and 922, specifically describing the network performance characteristic of the request or response.

The network traffic caused by a typical network transaction is described in FIG. 10, by example of an HTTP POST request and a corresponding HTTP Response. The transaction is triggered by an instrumented sender 1001, which sends a SYN packet 1003 to initiate the creation of a TCP session with the instrumented receiver 1002. The receiver 1002 responds with a SYN ACK packet which is received by the sender which acknowledges the SYN ACK packet by sending back an ACK packet. After the receiver has received the ACK packet, the TCP session between sender and receiver is established. The time between sending the first SYN pack by the sender and receiving the second ACK packet by the receiver is also called TCP Session establishment time 1030. After the basic TCP session is established, sender and receiver may optionally negotiate a security session like e.g. a SSL session, which requires the exchange of negotiation packets 1006 between sender and receiver. The time between start and finish of the SSL session is called SSL session establishment time 1040. Afterwards, an optional HTTP Authentication phase 1050 is performed, in which the sender first sends a packet containing authentication data 1007, which is answered by the receiver with a packet containing the authentication result 1008. After those preparation steps of the network transaction are finished, the sender starts sending packets containing the request data 1009 which are received by the receiver. This request data may also contain a traceId 322 inserted by a sensor injected to the instrumented sender 1020. The time elapsed between sending and receiving the request packets is also called request time 1060. After the receiver received all request packets 1009, it starts analyzing the request and creating the corresponding response. The time required to perform these activities is also called server processing time 1070. Those activities may also be monitored and reported in detail by sensors deployed to the instrumented receiver 1002. Additionally, those sensors may insert a traceId 322 to the created response 1021.

The response is split into response packets 1010, which are sequentially transferred from the receiver to the sender. After a specific amount of transferred response packets, the sender acknowledges the correct receiving of the packets by sending an ACK packet back to the receiver. The receiver continues sending remaining response packets after receiving an ACK packet. After all response packets have been transferred successfully, the receiver sends a FIN packet to signal a finished network transaction to the sender, which acknowledges by returning a FIN packet. Sending of the FIN packets also tears down the TCP session. The time required to signal the end of the transaction and to tear down the connection is also called TCP session closure time 1090. The described time intervals can be measured by a network probe and are examples for network transaction/request or response specific measurements.

FIG. 11 conceptually describes the processing of a monitored network packet by a network probe 341. The process starts with step 1101 when the network probe 341 detects a bypassing network packet and continues with step 1102 which analyzes the incoming packet to e.g. detect the used protocol or identify the state of the ongoing network transaction. Such network packets are exchanged between sender 301 and receiver 330 to e.g. setup a network connection and to transfer requests and corresponding responses. Subsequent step 1103 extracts packet related measurements from the received packet, like e.g. size of the packet in bytes, number of resends for the packet or update accumulated network transaction related measurements, like total transferred bytes or an average transfer rate of the transaction. Additional, ambient measurements describing the current state of the network, like current network latency or failure rates may be fetched. All extracted and fetched measurements may be stored in corresponding fields of the transaction description record 801 describing the currently ongoing network transaction. Following step 1104 checks if the current passing packet finishes the currently ongoing network transaction. In case the network transaction is not finished, the process ends with step 1107. Otherwise, the process continues with step 1106 which sends tagged network measurements 347 created out of the transaction description record 801 describing the finished transaction to the monitoring node 350. For a detailed description of this process please see FIG. 12. Afterwards, the process ends with step 1107. It is obvious to those skilled in the art that network packets belonging to different network transactions may arrive at the network probe in an interleaved fashion, where between two packets belonging to one network transaction, one or more packets belonging to other transactions may pass the network probe. The network may use techniques already known in the art to correctly assign network packets to network transactions.

The process of creating tagged network measurements out of transaction description data is described in FIG. 12. The process is started when the network probe 341 detects a finished network transaction with step 1201. Subsequent step 1202 uses properties of the finished network transaction, like protocol type or protocol data, or features of the used network infrastructure, to determine if a passive tagging mechanism has been used by the server side tracing mechanism. Passive tagging does not add synthetic tracing data like a traceId 322 to network communication messages. It relies on already existing data contained in the transferred data instead to identify an individual network transaction, to correlate sender and receiver side tracing data and to combine the server side tracing data with corresponding network measurements. Thus, it can also be applied when protocols or network infrastructure is used that do not allow the modification of network transactions by a monitoring system. In case step 1202 detects that passive tagging was used, the process continues with step 1212, which creates a tagged measurement data record 347. Subsequent step 1213 uses the type of the protocol together with configuration data to determine how a messageId 701 can be extracted from the network transaction. Requirements for such a messageId are its uniqueness, it should uniquely identify a network transaction, accessibility by sender and receiver and that it has the same value for sender and receiver, i.e. it is not changed during the network transfer. It is noteworthy, that server side and network side tracing have to use the consistent mechanisms to extract the messageId, that produce the same messageId for a specific network transaction at the sender, the receiver and at the network probe 341. Subsequent step 1214 sets the extracted messageId to the traceId/messageId field 902 of the created tagged network measurement record, sets the passive tagging indicator 903 to indicate passive tagging and sets protocol type identifier 904, sender address 905 and receiver address 906 to corresponding values of the transaction description record 801. In case of passive tagging, protocol, sender and receiver address are additionally required by the correlation process performed by the event correlation unit 351. In case of e.g. a chained communication that is traced using passive tagging, where a first sender sends a message to a receiver, which also acts as a sender and forwards the message to a second receiver, unambiguous correlation would not be possible based on a messageId alone.

Subsequent step 1215 extracts measurement data for request, response and the whole transaction from the transaction description data record 801 and stores it in the corresponding fields of the tagged measurement data record 347. Following step 1209 sets the network segmentId 907 of the tagged network measurement record to a value that identifies the network segment in which the current network transaction measurements where acquired, and then sends the tagged network measurement data record 347 to the monitoring node 350. Afterwards, the process ends with step 1211.

In case step 1202 detects that protocol of the network transaction and network infrastructure allow active tagging, the process continues with step 1204, which uses information about the protocol used by the network transaction to apply a protocol specific search mechanism for a traceId 322. As an example, for an identified protocol HTTP, the traceId may be queried by searching for specific HTTP headers and extracting the corresponding values. It is noteworthy that a traceId query may be performed in both the request and the response part of the network transaction. Subsequent step 1205 checks if a traceId 322 has been detected in the transaction. If no traceId was found, the current transaction description record 801 is discarded in step 1210 and the process ends with step 1211. If otherwise a traceId was found, the process continues with step 1206 which creates a tagged measurement data record 347, followed by step 1207 which sets the extracted traceId 322 to the messageId/traceId 902 field of the tagged network measurements 347 and sets its passive tagging indicator 903 to indicate active tagging. Subsequent step 1208 extracts measurements describing the network transaction, its request and response from the transaction description data record 801 and sets it to the corresponding fields of the created tagged network measurements record 347. The process then continues with step 1209.

FIG. 13 shows an extended path correlation node, which adds a network segment measurement list 1305 to a path correlation node according to the teachings of U.S. patent application Ser. No. 12/191,409. Path correlation nodes are used to describe communication between different parts of a monitored transaction, like e.g. sender and receiver parts of a transaction that communicate using a computer network. An extended path correlation node 1301 may contain but is not limited to a forkId 1302, a sensorId 1303 and a call depth 1304 that may be used to identify the monitored method execution that performed the sending of the network communication message, a network segment measurement list 1305 containing corresponding network measurement describing the network communication in form of network segment measurement records 1310, and a child path reference list, containing references to tracing data segments describing the processing of the message by its receivers.

A network segment measurement record 1310 may contain but is not limited to a network segmentId 1311 to identify a specific network segment, specific 1312 and ambient 1313 measurements describing the processing of the corresponding network transaction in the network segment identified by the network segmentId 1311, and specific 1321, 1331 and ambient 1322, 1332 measurements describing the transfer and processing of the request and the response part of the network transaction in the specific network segment.

The process of combining server side tracing data with corresponding network measurements is shown in FIG. 14. The process is triggered when the event correlation unit 351 receives a tagged network measurements data record 347, and starts with step 1401. Subsequent step 1402 checks if the passive tracing indicator 903 of the received record is set to indicate passive tagging. If passive tagging is indicated, the process continues with step 1405 which uses sender 905 and receiver 906 address of the received data record to identify thread executions performed on the identified sender and receiver processes that potentially performed the network communication described by the incoming tagged network measurement data record 347. Subsequent step 1406 uses the received messageId 902 to identify matching tracing data fragments describing the thread executions that performed sending and receiving of the network transaction described by the incoming tagged network data record 347, and the extended path correlation node 1301 that describes the application/server perspective of the network communication. Subsequent step 1407 enriches the identified extended path correlation node 1301 with network measurements from the received data record, like specific and ambient network measurements describing request, response and complete processing of the described network transaction in the network segment identified by the received network segmentId 907. The measurements are stored in a new created network segment data record 1310. The network segmentId 1311 is set to the network segmentId 907 of the received data record. The network segment data record 1310 is added to the network segment measurement list 1305 of the previously identified extended path correlation node 1301. The process then ends with step 1408. In case of multiple network probes 341 installed to different segments of the computer network connecting sender and receiver, multiple tagged network measurement records would be received for a single extended correlation node 1301 and multiple network segment measurement data records 1310 with different network segmentIds would be added to the network segment measurements list 1305.

In case step 1402 determines that the passive tracing indicator 903 of the received tagged network measurement data record 347 indicates active tagging, the process continues with step 1403, which uses parts of the received traceId data (agentId and pathId) to identify the tracing data fragment (start path node) describing the thread execution that performed the sending of the network transaction described by the incoming data record. Subsequent step 1404 uses other parts of the received traceId (forkId) to identify the extended path correlation node within the previously detected tracing data fragment that describes the sending of the network transaction from the application/server perspective. Afterwards, the process continues with step 1407.

The provides description of the combination of server and network side tracing data assumes that server side tracing data is already available at the event correlation unit 351 when corresponding network measurement data arrives. This assumption allows to describe the combination process more compact, and to concentrate on concepts relevant for the current disclosure. It is obvious for those skilled in the art that network side tracing data and server side tracing data may arrive at the event correlation unit 351 in arbitrary order. Network tracing data may e.g. arrive before corresponding server side tracing data. It is also obvious for those skilled in the art that this problem can easily be solved by e.g. temporarily storing network tracing data for network tracing data for which no corresponding server side tracing data is currently available. If the event correlation engine detects a finished server side tracing data record, it may perform a process similar to the process described in FIG. 14 for all temporarily stored network tracing data records and the finished server side data record. Network tracing data records for which corresponding server side tracing data was found, are removed from the temporary storage.

FIG. 15 shows an exemplary visualization form of combined server side and network side tracing data.

The stack trace of a sender side transaction execution is displayed in the upper part of the screenshot, see 1501. At a specific point of execution, the sender calls a method that performs the network communication, see 1502. The visualization of the server side perspective of the communication 1503 only describes the type of the performed network communication (e.g. HTTP). The agent information for the server side tracing data 1507 of the sender shows that the whole execution is reported by one specific agent 306. This implies that the execution was performed by one, local application component.

The server side tracing data of the corresponding receiver part of the processing, containing the method that receives the request 1505 and further method calls performing detailed processing to generate the requested response 1506 is showed in the middle of the screenshot. The agent information of the receiver part 1508 also shows a local execution on the receiver component up to method call 1509 which in turn starts a HTTP based communication with another application component.

Tracing data describing the network perspective of the performed communication may be applied to the corresponding server side visualization of the specific network communication 1503. The visualization of the network data may e.g. be performed via a context menu entry that shows detailed network measurements 1504 of the selected communication 1503.

A variant of a combined server side and network side monitoring and tracing system that maintains different tracing data buffers for server side tracing data and network tracing data is shown in FIG. 16.

In this variant, the agents 306 send the path events 307 to a dedicated server monitoring node 1601, which processes them in an event correlation unit 1602 to form end-to-end transaction tracing data reflecting only the server side perspective of traced transactions. The generated transaction tracing data is stored in a transaction buffer 1603 and may be used for later storage, analysis or visualization by combined or separate storage, analysis and visualization modules 1604.

The network probe 341 generates tagged network measurements 347 as previously described, but it sends them to a separate network monitoring node 1605, which stores them in a tagged network measurement buffer 1606 for later storage, analysis or visualization by corresponding combined or separate modules 1607.

Both separate monitoring nodes may communicate with each other for on-demand correlation and combination of server and network side tracing data.

As an example, if the network monitoring data accumulated in the tagged network measurement buffer 1606 indicates a performance degradation of a specific network connection or network segment, the network monitoring node 1605 may send a query for transactions affected by the detected network degradation 1608 to the server monitoring node 1601. The query may contain network degradation description data 1609, which may contain but is not limited to data describing the affected network communication link, potentially affected communication partners, time period of the degradation and traceIds 322 of tagged network measurements reflecting the detected network degradation. The server monitoring node 1601 may use the data of the network degradation description to identify transaction tracing data describing transactions that were affected by the degradation and send those matching transactions 1610 back to the network monitoring node 1605 which may use the received tracing data for further analysis and/or visualization.

In case unexpected communication latency is detected in tracing data describing the server side perspective of a monitored transaction, the server monitoring node 1601 may issue a network measurement query 1611 to the network monitoring node 1605. The network measurement query 1611 may provide network measurement identification data 1611, which may contain but is not limited to traceIds 322 identifying specific network communications in case of active tagging, or messageIds together with additional data to identify communication protocol and communication participants in case of passive tagging. The network monitoring node 1605 may use the received network measurement identification data 1611 to find corresponding tagged network measurements 347 in the tagged network measurement buffer 1606. Those matching network measurements 347 are sent back to the requesting server monitoring node 1601, which uses the received network measurement data for further analysis and visualization.

A variant of a monitoring system that is capable to monitor distributed transactions using an application level protocol that is unknown by the monitoring system is described in the following sections. Some application operators may implement and operate proprietary communication protocols tailored to their specific needs. Typically, a monitoring system does not provide specialized sensors to monitor communication performed using such protocols. Although monitoring systems may provide extension mechanisms that allow adding support for such proprietary protocols in the field, adding such extension mechanism cause considerable implementation and testing efforts, which customers try to avoid.

Consequently, a solution is desired that allows monitoring of such proprietary application protocols with minimizes need for protocol specific sensor extensions.

Although such proprietary application level protocols use specialized message types optimized for the purpose of the application, the underlying protocol used to transport those specialized measures over a computer network is typically the standard protocol TCP/IP. For transmission, those proprietary application measures are split up to several TCP/IP packets.

The described monitoring system uses the sequence number which is transferred in the header of TCP/IP packets, to identify TCP/IP packets representing a specific application message.

The relationship between bytes transferred over a specific TCP/IP connection and the sequence number of individual TCP/IP packets is shown in FIG. 17.

A TCP/IP connection is established at a specific point of time 1701, and a specific, randomly chosen start sequence number is assigned to the first sent TCP/IP packet 1703*a*. In the example described in FIG. 17, this initial sequence number is 30. The sender application sends message 1 1701*a* consisting in 30 bytes, which is split into TCP/IP packets 1703*a* and 1703*b* with sequence numbers 30 (start sequence number used by the first TCP/IP packet sent over the connection) and 50 (start sequence number+number of bytes already sent over the network). The number of bytes sent over the connection is 0 before sending of message 1 and 30 afterwards. Afterwards, message 2 containing 35 bytes is sent, which is split into TCP/IP messages 1703*c* and 1703*d* with sequence numbers 60 and 80, the number of bytes sent over the connection is 30 before and 65 after sending the message. Finally, message 3 with 30 byte is sent and split into TCP/IP messages 1703*e* and 1703*f* with sequence numbers 95 and 115 are sent. The number of sent bytes is 65 before sending message 3a and 95 afterwards.

This example shows that the TCP/IP packets related to a specific message sent or received on a specific TCP/IP connection can be derived from the total number of bytes transferred over the connection and the start sequence number of the TCP/IP connection. Considering now the sending of message 2, which allocates bytes 30 to 65 of the total bytes transferred over the connection on application level. To identify the corresponding TCP/IP packets for message 2, it is sufficient to add the start sequence number of the TCP/IP connection to the start and end byte index of message 1, e.g. 30+30 and 65+30 and then select TCP/IP packets with a sequence number equal or greater to the calculated message start sequence number of 60 and smaller than the calculated message end sequence number of 95. Matching TCP/IP packets are 1703*c* and 1703*d*.

FIG. 18 shows an overview of a monitored system using a proprietary application level protocol to execute distributed transactions and a monitoring system capable to trace such transactions without knowledge of the used application level protocol.

An instrumented sender 301 executes a monitored distributed transaction which invokes a TCP/IP send method 1801 dedicated to send a message using an arbitrary protocol unknown by the monitoring system. A TCP/IP send sensor 1802 is instrumented to the TCP/IP send method at a position when sending the message is finished. The TCP/IP sensor determines the number of bytes transferred over the TCP/IP connection to send the message and fetches the total number of bytes sent over the TCP/IP connection since connection establishment from the TCP/IP endpoint tracker 1805.

Afterwards, the TCP/IP send sensor creates a path event 307 indicating the sending of a message that is traced using TCP/IP sequence numbers. The path event contains, next to correlation data required to identify the sender thread within the sender application, data to identify the used TCP/IP connection, like IP address and port of sender and receiver, and data to identify the TCP/IP packets used to transfer the message, containing the number of the first and last byte of the message in the total sequence of bytes sent over the TCP/IP connection.

The path event 307 is sent to the agent 306, which enriches it with its agentId 308 to uniquely identify the sender application 301. The agent forwards the path event 307 to a monitoring node 351 for correlation via a connecting computer network 309.

Afterwards, the TCP/IP sensor notifies the TCP/IP endpoint tracker 1805 about the number of payload bytes just sent over the TCP/IP connection. The term "payload bytes" is used herein to denote those bytes that form the application relevant data of a message. It excludes additional bytes sent over a TCP/IP connection to e.g. form header of TCP/IP packets or header data of underlying protocol packets.

The TCP/IP endpoint tracker identifies the TCP/IP connection endpoint record 1901 representing the used TCP/IP connection by e.g. address and port of sender and receiver and increments its cumulative transferred bytes 1905 by the number of bytes sent to transfer the message.

The TCP/IP endpoint tracker 1805 detects 1804 establishment of new or shutdown of existing TCP/IP connections 1819 and stores identification data 1902 to identify a specific TCP/IP connection and cumulative transferred bytes 1905 in a TCP/IP connection endpoint record 1901.

The TCP/IP endpoint tracker stores TCP/IP endpoint records 1901 in a way that makes them accessible by different threads using the same connection. As an example, thread 1 creates a TCP/IP connection, and sends a first message over the connection and then terminates. Instead of closing the connection on termination, it stores it in a global variable to allow subsequent threads 2-n to reuse the connection by also sending messages. This causes subsequent executions of TCP/IP send sensors 1802 in different threads which need read and write access to the TCP/IP endpoint record 1901 representing the used connection.

The sender application 301 establishes a TCP/IP connection 1819 to the receiver application 331 to send a message 1806. The message 1806 is split into a set of TCP/IP packets which are transferred over the TCP/IP connection.

A network probe 1811 is capable to detect establishment and shutdown of TCP/IP connections, to identify transferred TCP/IP packets and to acquire performance measurements describing the transfer of those TCP/IP packets. Such a network probe 1811 may be combined with network probes 341 described earlier in this documented, in a way that if protocol detection 342 successfully detects an application level protocol, the combined network probe works as network probe 341 and otherwise works like network probe 1811 and performs measurement on TCP/IP packet level.

A TCP/IP connection tracker 1812 operated by the network probe 1811 detects establishment and shutdown of TCP/IP connections 1819 and maintains a repository of TCP/IP connection records 1910 containing identification data 1911 uniquely identifying an individual TCP/IP connection and the start sequence number 1914 of the connection.

Additionally, the network probe 1811 contains a packet analysis and measure acquisition unit 1814 which monitors passing data, identifies TCP/IP packets, acquires performance measurement data relevant for the detected TCP/IP packets and stores the acquired measurements together with correlation data allowing the identification of the individual TCP/IP packet in form of TCP/IP packet measure records 2310 in its packet measurement repository 1813. Additionally, the network probe provides a network measurement interface 1815 which provides access to stored TCP/IP packet measurement records, e.g. to a monitoring node 350.

The TCP/IP packets 1807 forming the sent message 1806 are received by a TCP/IP receive method 1809 executed by an instrumented receiver application 331. Prior to receiving the TCP/IP packets, a TCP/IP connection 1819 with the sender application 301 is established, which is recognized by the TCP/IP endpoint tracker 1805 instrumented to the receiver. Establishment of the TCP/IP connection causes the TCP/IP endpoint tracker to create a corresponding TCP/IP endpoint record 1901 with a cumulative transferred bytes field set to 0.

Afterwards, the TCP/IP packets 1807 representing the message 1806 are read from the TCP/IP connection 1819 by the TCP/IP receive method 1809, which is instrumented with a TCP/IP receive sensor 1810. The TCP/IP receive sensor is instrumented to the TCP/IP receive method 1809 in a position where receiving of the message is finished. The sensor determines the number of received payload bytes forming the message and fetches the cumulative transferred bytes 1905 of the TCP/IP connection used to receive the message from the TCP/IP endpoint tracker 1805. Afterwards, the TCP/IP receive sensor 1810 creates a path event 307 indicating the receiving of a message using an unknown protocol and adds data identifying the TCP/IP connection used to receive the message and data identifying the TCP/IP packets used to transfer the message as additional correlation data to the created path event. The path event is sent to the monitoring node 350 for correlation.

The monitoring node 350 receives path events indicating the sending and receiving of a message using an unknown protocol from the sender 301 to the receiver 331. On correlating both events to form end-to-end transaction tracing data, the monitoring node sends a network measure request 1817 to all deployed monitoring nodes 1811 to receive TCP/IP packet measure records 2310 for all TCP/IP packets involved in the transfer of the message. The TCP/IP packet measures received in form of network measure responses 1816 are used by the correlation engine 351 to enrich the part of the end-to-end transaction trace data representing the message sending with corresponding network measurement data. Afterwards, the end-to-end tracing data containing sender, receiver and network related tracing data is stored in the transaction buffer 352, and may subsequently be used by the storage/analysis and visualization unit 353.

FIG. 19 depicts data records that may be used by TCP/IP endpoint trackers 1805 and TCP/IP connection trackers 1812 to store data about a specific TCP/IP connection. A TCP/IP connection endpoint record 1901 which may be used by TCP/IP endpoint trackers 1801, may contain but is not limited to identification data 1902 containing data to identify a specific TCP/IP connection, like address and port of a sender 1903 and a receiver 1904, and a field cumulative transferred bytes 1905 which contains the number of bytes transferred on the connection in one direction since connection establishment.

A TCP/IP Connection Record 1910 which may be used by TCP/IP connection tracker 1812 may contain but is not limited to identification data 1911 uniquely identifying a TCP/IP connection, and a start sequence number 1914 containing the sequence number used for the establishment of the described TCP/IP connection. The start sequence number corresponds to the first byte sent over the connection.

Processes that may be performed by a TCP/IP endpoint tracker 1805 to keep track of existing TCP/IP connection and the number of bytes transferred over those connections are shown in FIG. 20. FIG. 20a describes the processing of a detected TCP/IP connection establishment by the TCP/IP endpoint tracker. The process starts with step 2001, when a new TCP/IP connection establishment was detected. Such detection may e.g. be performed by placing a sensor in code that either actively requests a new TCP/IP connections or code that accepts an incoming request for a new TCP/IP connection. As an example, in an Oracle Java® based environments, in the class java.net.Socket, specifically "connect" methods could be instrumented for active connection requests, and "accept" methods could be instrumented for accepted incoming connection requests.

Subsequent step 2002 extracts address and port of sender and receiver of the new TCP/IP connection. Address and port uniquely identifies an endpoint of a TCP/IP connection, and sender and receiver represent both endpoints of the TCP/IP connection, which uniquely identifies the TCP/IP connection. In Oracle Java® environments this information is available in java.net.Socket objects representing TCP/IP connections and is thus accessible for the TCP/IP endpoint tracker 1805.

Following step 2003 creates a TCP/IP connection endpoint record 1901 and sets its identification data 1902 to the previously extracted sender and receiver address and port, and sets the value of cumulative transferred bytes 1905 to 0 because up to now, no payload data was transferred by the new TCP/IP connection.

Step 2004 stores the created TCP/IP connection endpoint record 1901 in the connection repository of the TCP/IP endpoint tracker, and subsequent step 2005 terminates the process and returns control to the calling process.

The connection repository contains TCP/IP connection endpoint records 1901 for all currently established TCP/IP connection of the application (e.g. instrumented sender 301 or instrumented receiver 330) the agent 306 is deployed to.

FIG. 20*b* describes the processing a TCP/IP connection close by the TCP/IP endpoint tracker. Closing of a TCP/IP connection may be detected by placing a sensor in methods that intentionally close a TCP/IP connection, like e.g. a "close" method in a java.net.Socket class in combination with sensors indicating an unexpected connection close. An unexpected connection close may e.g. occur when either one of the communication partners (e.g. instrumented sender 301 or instrumented receiver 330) crashes or the interconnecting network is disconnected. As a consequence, method calls to write data to or read data from the unexpectedly closed TCP/IP connection fail with an exception indicating a closed connection. A sensor placed to these methods which detects such exceptions may be used by the TCP/IP connection endpoint tracker to detect unexpectedly closed connections.

The process starts with step 2010 when closing of a TCP/IP connection is detected. Following step 2011 extracts connection identification data like address and port of sender and receiver, similar to the process detecting a TCP/IP connection establishment in step 2002. Afterwards, the TCP/IP endpoint record 1901 with matching sender and receiver address and port is removed from the connection repository in step 2012. The process then terminates with step 2013 and returns control to the calling process.

FIG. 20*c* shows the process of updating the number of cumulative transferred bytes 1905 after transfer of a given number of payload bytes over a specific TCP/IP connection was performed.

The process starts with step 2020, when finished data transfer was detected. Typically, finished data transfer is indicated by the successful call of a method that writes data to or reads data from an object representing a TCP/IP connection. The written or read data is available in a serialized form e.g. as an array of bytes. This allows easy determination of the number of written or read payload bytes by accessing the size of this array of bytes. The object representing the TCP/IP connection also provides data that identifies the represented TCP/IP connection (e.g. address and port of both connection endpoints). For a detailed description of the detection of finished data please refer to FIG. 21. Step 2021 receives connection identification data 2021 containing address and port of sender and receiver identifying the used TCP/IP connection together with the number of payload bytes currently transferred over the connection. Following step 2022 fetches the TCP/IP connection endpoint record representing the used TCP/IP connection from the connection repository and subsequent step 2023 adds the received number of transferred bytes to the cumulative transferred bytes 1905 of the fetched TCP/IP connection endpoint record. This assures that the field cumulative transferred bytes 1905 always represents the total number of bytes transferred over the connection. Afterwards, the process ends with step 2024.

FIG. 20*d* shows the process of fetching the cumulative transferred bytes of a specific TCP/IP connection as performed e.g. by a TCP/IP send or receive sensor 1802 or 1810 to fetch correlation data for a TCP/IP based message transfer. The process starts with step 2030, e.g. when a TCP/IP send sensor 1802 or a TCP/IP receive sensor request the cumulative number of transferred bytes for a specific TCP/IP connection. Afterwards, the process receives address and port of sender and receiver of the message in step 2031, which identifies the used TCP/IP connection. Subsequent step 2032 fetches the matching TCP/IP connection endpoint record 1901 from the connection repository and following step 2033 returns the cumulative transferred bytes 1905 to the calling process. The process ends in subsequent step 2034.

The TCP endpoint tracker provides the cumulative number of bytes transferred over a specific TCP/IP connection for each open TCP/IP connection in a centralized way. This allows accessing and updating the cumulative transferred bytes of a specific TCP/IP connection from different threads using TCP/IP connections in a shared way. The cumulative transferred bytes corresponding to a message transfer on the sender and the receiver side are identical. As a consequence, the cumulative transferred bytes may be used as part of correlation data to find matching trace data describing the sender and the receiver part of the distributed transaction that performed the message sending. As there is a fixed relationship between the sequence number of a specific TCP/IP packet transferred and the cumulative transferred bytes that is defined by the start sequence number of the used connection, the cumulative transferred bytes of a message may also be used to identify TCP/IP packets related to the transfer of the message.

FIG. 21 depicts both the execution of a TCP/IP send sensor 1802 and a receive sensor 1810, as performed on sending or receiving a message over a TCP/IP connection, using an application level protocol unknown to the monitoring system.

FIG. 21*a* describes the execution of a TCP/IP send sensor 1802, which starts with step 2101, when an attempt to send a TCP/IP message was detected. Following step 2102 extracts address and port of sender and receiver of the message to be sent, which also uniquely identifies the TCP/IP connection used to transfer the message. Afterwards, step 2103 fetches the cumulative transferred bytes of the TCP/IP connection used to transfer the message. This may e.g. be performed by executing the process described in FIG. 20*d* on the TCP/IP endpoint tracker 1805. Subsequent step 2104 determines the number of payload bytes to transfer for the message and following step 2105 performs the actual sending of the payload bytes representing the message.

Afterwards, a path event 307 indicating the sending of a message over a specific TCP/IP connection using an unknown application level protocol is created in step 2106, and following step 2107 initializes the path event with additional correlation data, including but not limited extracted connection identification data containing address and port of sender and receiver, cumulative transferred bytes of the used TCP/IP connection before sending the message and the number of transferred payload bytes representing the message.

This additional correlation data allows to identify the TCP/IP connection used to transfer the message and to identify within the overall sequence of payload bytes transferred over the connection, the subsequence of payload data bytes representing the message, and in conjunction with the start sequence number of the connection, to identify the TCP/IP packets used to transfer the message. The corresponding receiver part extracts corresponding additional correlation data which allows identifying matching sender/receiver pairs. Existing correlation data may include data to identify the enclosing instrumented method call performing the message sending, the thread which executes the sending message, and the process that executes the thread, as described in U.S. Pat. No. 8,234,631.

Following step 2108 checks if sending the payload bytes representing the message was successful. In case of a successful send, the process continues with step 2109 which updates the cumulative transferred bytes 1905 of the TCP/IP connection endpoint record 1901 by adding the number of payload bytes representing the sent message. This may e.g. be performed by executing the process described in FIG. 20c. Afterwards, step 2111 sends the created path event 307 to the monitoring node 350 for correlation. The process then ends with step 2112. In case step 2108 determines that sending the payload bytes was not successful, the process continues with step 2110 which updates the path event to indicate a failed message handling. Afterwards, the process continues with step 2111 and following steps.

In an Oracle Java® environment, a TCP/IP send sensor 1802 may be implemented by instrumenting the method "socketWrite" of the class java.net.SocketOutputStream (the class java.net.SocketOutputStream is used to write data to an existing TCP/IP connection). This method receives a sequence of payload bytes together with information about the size of the payload data in bytes. A first part of the TCP/IP send sensor may be instrumented to the start of method "socketWrite", which fetches the cumulative transferred bytes of the used TCP/IP connection before sending of the message was preformed from the TCP/IP endpoint tracker, and which evaluates the parameter values of the current "socketWrite" call to determine the number of payload data to be sent. This part of the sensor may also fetch address and port of sender and receiver by accessing the java.net.Socket object used by the java.net.SocketOutputStream and e.g. calling methods "getLocalSocketAddress( )" and "getRemoteSocketAddress( )".

The code part of "socketWrite" that performs the actual sending of the payload data via the TCP/IP connection is protected by a "try/catch" block to handle exceptions occurring during sending the data. A second part of the TCP/IP send sensor may be placed in the "catch" section which is only executed when such exceptions occur. This part of the sensor may be used to determine if sending was successful.

Finally, a third part of the sensor may be instrumented after the "try/catch" block, which stores information retrieved by the other parts of the sensor in a path event, sends it and which also updates the connection usage of the TCP/IP endpoint tracker in case of a successful send.

FIG. 21b describes the execution of a TCP/IP receive sensor, which is triggered on an attempt to read a message from a TCP/IP connection. The process starts with step 2120 when such an attempt is detected and continues with step 2121 which extracts address and port of sender and receiver of the message which is going to be read. This identifies the TCP/IP connection used to transfer the message and is used to fetch the cumulative transferred bytes of the used connection from the TCP/IP connection tracker. The fetched value of cumulative transferred bytes is identical with the value cumulative transferred bytes fetched by the TCP/IP sender sensor on the sender side. Afterwards, step 2123 performs the actual reading of the payload data representing the message from the TCP/IP connection, and following step 2124 determines the number of payload bytes read from the TCP/IP connection. Subsequent step 2125 creates a path event 307 indicating the receiving of a TCP/IP message using an unknown application level protocol and step 2126 initializes the path event with the additional TCP/IP specific correlation data, similar to step 2107 of the TCP/IP send sensor. Step 2127 afterwards updates the cumulative transferred bytes 1905 of the TCP/IP connection endpoint record 1901 describing the used connection on the receiver side, and step 2128 sends the path event 307 to the monitoring node 350 for correlation. The process then ends with step 2129.

In an Oracle Java® environment, a TCP/IP receive sensor 1810 may be implemented by instrumenting the method "read" of the class java.net.SocketInputStream (the class java.net.SocketInputStream is used to read data from an existing TCP/IP connection) which internally calls the code that actually reads from a TCP/IP connection. A first part of the sensor may be instrumented to the beginning of the "read" method before actual reading of data from the TCP/IP connection is started. This first part of the TCP/IP receive sensor may fetch address and port of sender and receiver and cumulative transferred bytes of the used TCP/IP connection, similar to the first part of the TCP/IP send sensor described above. A second part of the TCP/IP receiver sensor may be instrumented after the code that performs the actual reading of the payload data from the TCP/IP connection, i.e. after call to method "socketRead0". The method "socketRead0" also returns the number of bytes read from the TCP/IP connection. This return value may be captured by the second part of the TCP/IP receive sensor, which updates the cumulative transferred bytes of the connection with the number of read payload bytes and creates and sends a corresponding path event 307.

The Oracle Java® API for transferring data over TCP/IP connections provides "write" methods which accept data in form of a byte buffer of arbitrary length containing the data to be sent, and "read" methods which accept a byte buffer of a specific length which is used to store data read from the used TCP/IP connection. The "read" method reads data available on the TCP/IP connection up to the size of the read buffer. With this API, it is possible that a message written to the TCP/IP connection with one "write" call requires multiple "read" calls in case the read buffer used on the receiver side is smaller than the message size.

As an example, a message containing 100 payload bytes is sent over a TCP/IP connection. Cumulative transferred bytes before sending the message is e.g. 250. This would result in a path event with cumulative transferred bytes set to 250 and message size 100. The receiver side provides a read buffer of 50 bytes, and performs a first "read" call that reads the first 50 bytes into the buffer, which creates a path event with cumulative transferred bytes set to 250 and message size set to 50. A second "read" call for the second 50 byte would create a second path event with cumulative transferred bytes set to 300 and message size set to 50. The event correlation 351 needs to be aware of such situations, and e.g. in case of path event nodes indicating sending and receiving a TCP/IP message which match in address and port of sender and receiver and in cumulative transferred bytes, but show a greater message size on the sender size, also consider path events describing subsequent reads for the transferred message. This could e.g. be performed by selecting path events describing a received TCP/IP message with matching address and port data and with a cumulative transferred bytes value smaller than sender side cumulative transferred bytes+sender side message size.

In some monitored applications, sending or receiving a message may be split into multiple consecutive calls to write or read chunks of bytes from a TCP/IP connection. In such a situation, a sender or receiver thread would first gain exclusive access to the TCP/IP connection, by e.g. locking it. Afterwards, it would perform multiple writes (sender) or reads (receiver). After finished message transfer, it would release the TCP/IP connection, allowing its usage by other threads. It may be meaningful in some cases to not report those multiple individual reads and writes in transaction trace data, but to aggregate them and to report the transfer of the whole message. Such a tracing behavior may be achieved by slightly modifying the functionality of TCP/IP send sensor 1802 and TCP/IP receive sensor 1810. A first part of the sensors may be placed after the code that locks the TCP/IP connection for sending or receiving. This part may perform steps 2102 and 2103 (send sensor) or 2121 and 2122 (receive sensor) to fetch and store connection identification data and the cumulative transferred bytes of the connection before the message was transferred. The code that actually reads or writes data from the connection, may be instrumented with a sensor part that performs step 2109 (sender) or 2127 (receiver) to update cumulative transferred bytes of the connection. Finally, a part of the sensor may be place by e.g. bytecode instrumentation in code that is executed directly before the code that releases the connection. This sensor part fetches the cumulative transferred bytes of the connection again, to calculate the size of the message (cumulative transferred bytes before connection release−cumulative transferred bytes after connection acquisition) and which creates and sends a corresponding path event 307.

Referring now to FIG. 22, showing the processing of a TCP connection tracker 1812, as contained in a network probe 1811, to track establishment and shutdown of TCP/IP connections within the network segment monitored by the network probe. FIG. 22a depicts the detection of a new established TCP/IP connection based on the detection of TCP/IP packets used to signal a new TCP/IP connection. This sequence starts with a SYN packet, sent from the communication partner that actively establishes the connection, i.e. the sender 301 to the communication partner passively waiting for connection requests, i.e. the receiver 330. The receiver replies with a SYN-ACK packet which is received by the sender and which sends an ACK packet back to the receiver, which finishes the TCP/IP connection establishment process. The process is started with step 2201 when the network probe 1811 is activated. Step 2202 permanently analyzes incoming TCP/IP packets for a SYN/SYN-ACK/ACK packet sequence indicating a new TCP/IP connection. In case check 2203 indicates a new TCP/IP connection, the process continues with step 2204, otherwise with step 2202. Step 2204 extracts address and port of sender and receiver from one of the three received packets indicating the new established connection, as this data is sent in the header of each TCP/IP packet. Following step 2205 extracts the start sequence number of the new connection, e.g. by using the sequence number sent with the ACK packet that confirms the new connection. Following step 2206 creates a TCP/IP connection record 1910 and sets it sender address and port 1912 to address and port of the part triggering the connection setup, i.e. the sender, sets receiver address and port 1913 to address and port of the part that accepts the connection, i.e. the receiver and sets start sequence number 1914 to the start sequence number extracted in step 2205. Following step 2207 stores the created TCP/IP connection record 1910 in the connection repository and the process continues with step 2202.

Detection of a TCP/IP connection shutdown is performed in FIG. 22b. The process is initialized with step 2210 when the network probe 1811 is activated. Subsequent step 2211 scans for TCP/IP packets indicating the termination of a TCP/IP connection. TCP/IP connections are terminated by a sequence of FIN/ACK packets as follows. In case one of the communication partners decides to terminate the connection, its sends a FIN packet to the other part. The other part acknowledges the termination request with an ACK packet and then sends a FIN packet to the part initializing the termination. After the second FIN packet is acknowledged with an ACK packet, the connection is terminated. Step 2211 scans passing TCP/IP packets for such a packet sequence indicating the termination of a TCP/IP connection. If following check 2212 identifies such a sequence on a TCP/IP connection, the process continues with step 2213, otherwise with step 2211. Step 2213 extracts address and port of sender and receiver from one of the detected packets in the FIN/ACK/FIN/ACK sequence and following step 2214 removes the corresponding TCP/IP connection record 1910 from the connection repository. Afterwards, the process continues with step 2211 and scans for the next terminated TCP/IP connection.

TCP/IP packets for different TCP/IP connections may pass the network probe in a multiplexed way and multiple TCP/IP connections may be established or closed simultaneously. Consequently, steps 2202 and 2211 may be performed continuously, and steps 2203 to 2207 and 2212 to 2214 may be executed in parallel threads while packet analysis to detect new established or terminated TCP/IP connections is ongoing.

Technically, a TCP/IP connection consists in two distinct, one way data channels to allow bidirectional data transfer between communication partners. Each one way data channel has its own sequence numbers, correlating to the number of bytes sent over the channel. This feature of TCP/IP connections was abstracted during the above description of exemplary embodiments to avoid distraction from the essences of the described methods and concepts. However, the described embodiments may easily be adapted to cover two one way data channels by separately counting the number of sent and received bytes on sender and receiver side, and by fetching and storing a start sequence number for each one way channel of the TCP/IP connection.

The analysis of TCP/IP packets sent over an already established TCP/IP connection, and a data structure that may be used to store packet identification and measurement data for individual TCP/IP packets is shown in FIG. 23.

FIG. 23a depicts the processing of passing TCP/IP packets by a network probe 1811 on an established TCP/IP connection. The process starts with step 2301 when a passing TCP/IP packet is detected by the network probe 1811. Subsequent step 2302 extracts address and port of sender and receiver from the TCP/IP packet and following step 2303 extracts the sequence number and number of payload bytes (e.g. length of encapsulated IP packet minus IP header length and TCP header length) from the TCP/IP packet. A TCP/IP packet measure record 2310 is created in subsequent step 2304, which also sets packet identification data 2311 to data retrieved in previous steps. Step 2305 afterwards retrieves performance measurement values specific for the currently analyzed TCP/IP packet, which may include but are not limited to the total size of the packet, including header data, the number of resends for this specific packet, and performance measures describing the performance of the network segment monitored by the network probe while the TCP/IP packet is transferred, which may include but are not limited to the average failure rate or the average latency of network segment at the point of time when the TCP/IP packet is passing. Sender and receiver address and port, sequence number, number of payload bytes and retrieved packet specific and ambient measurement are stored in the TCP/IP packet measure record 2310 created in step 2304. Subsequent step 2306 stores the TCP/IP packet in the packet measure buffer 1813 of the network probe 1811. Various filtering methods may be applied in step 2306 to store only TCP/IP packets with a negative performance impact by evaluating the before extracted measurements. As an example, TCP/IP packet measure records may only be stored in the packet measure buffer if the number of resents exceeds a specific threshold. Subsequent step 2307 terminates the process.

FIG. 23*b* shows a TCP/IP Measure Record 2310 which may be used to store measurement results created by the process described in FIG. 23*a*. A TCP/IP Measure Record 2310 may contain but is not limited to a packet identification data section 2311 containing data to identify a specific TCP/IP connection, consisting e.g. in a sender and receiver address and port 2312 and 2313, and additionally containing data to identify a specific TCP/IP packet within the TCP/IP connection like a sequence number 2313, a field number of payload bytes 2318 containing the amount of payload bytes transferred by the TCP/IP packet, the start sequence number 2319 of the TCP/IP connection used to transfer the packet, packet specific 2320 and ambient 2321 performance measures related to the TCP/IP packet. The field start sequence number 2319 may be used for specific embodiments that fetch TCP/IP packet measure records from network probes delayed, potentially after the TCP/IP packet used to transfer the TCP/IP packet was terminated. In this case, the TCP/IP connection record 1910 describing the connection and also providing the start sequence number 1914 of the TCP/IP connection may no longer be available. Storing the TCP/IP start sequence number also redundantly in TCP/IP packet measure records 2310 allows accessing the start sequence number also in such situations. The sequence number used by TCP/IP packets is stored in a 32 bit field and has thus a range from 0 to 2^32. The start sequence number is randomly chosen from this range and, and the sequence number of a TCP/IP packet is incremented by the number of payload bytes sent with the packet. An overflow of the sequence number during the usage of a TCP/IP connection is allowed by the protocol and must also be handled by the network probe in a way that it is still possible to match byte counts provided by sender and receiver with sequence numbers from TCP/IP packets after one or multiple overflows of the TCP/IP sequence numbers. As an example, the network probe may detect such overflows (i.e. numeric value of current sequence number lower than numeric value of previous sequence number) and then modify the received sequence number to reflect the detected overflow (i.e. add number of detected overflows multiplied by 2^32 to the extracted sequence number).

FIG. 24 describes the process of correlating server side transaction data describing a TCP/IP based communication using an application level protocol that is unknown to the monitoring system, with corresponding network side performance measurements together with data records to communicate with network probes 1811 to retrieve network measurement data relevant for the communication.

The process of correlating server side tracing data describing a TCP/IP based communication with corresponding network side performance measurement data is shown in FIG. 24*a*. The process starts with step 2401, when the event correlation 351 receives a path event 307 indicating a TCP/IP based communication using an application level protocol that is unknown to the monitoring system. Such path events 307 may be received from sender and receiver if both are instrumented or from only one of them if on case only one of them is instrumented. The process starts when it can be guaranteed that the corresponding message is transferred over the network and thus recorded by all passed network probes. As an example, the process may start when either both path events 307 from sender and receiver are received and tracing data describing sender and receiver part are already connected, or in case of a not instrumented sender or receiver, after it can be determined that no further path events for the transaction containing the TCP/IP base communication can be expected. This determination may be performed according to the methods described in U.S. patent application Ser. No. 12/971,408 entitled "Completeness Detection of Monitored Globally Distributed Synchronous and Asynchronous Transaction" which is included in its entirety herein by reference.

The process starts with step 2401 on the detection of tracing data indicating a TCP/IP based communication using an application level protocol unknown by the monitoring system. Subsequent step 2402 extracts sender and receiver address and port and start and end byte index corresponding to the transferred message from the tracing data. This data may be fetched from path event nodes and stored as additional data in the path correlation node 1301 describing the communication during the correlation of sender and receiver side transaction tracing data. The extracted address, port and byte index data may be used in step 2403 to initialize a TCP/IP measure request 2410. The created TCP/IP measure request identifies the TCP/IP connection used to transfer the message, and within the TCP/IP connection the TCP/IP packets corresponding to the message. In step 2404, the created TCP/IP measure request is sent to all network probes connected to the monitoring system and in subsequent step 2405 responses in form of TCP/IP measure responses 2420 are received from those network nodes.

Alternative embodiments may use a centralized network monitoring node 1605, to which all network probes 1811 send their TCP/IP packet measure records. In those alternative embodiments the monitoring node 350 may send its TCP/IP measure request to this network monitoring node and also receive the corresponding TCP/IP measure response from this network monitoring node.

Subsequent step 2405 processes each received TCP/IP measure response and creates aggregated specific and ambient measures (e.g. average/min/max resends of all packets) for each network segment, and following step 2406 creates corresponding network segment measures 1310, by setting the network segment id 1311 to the network segment id 2421 of the corresponding TCP/IP measure response. Specific network measurements 1312 and ambient network measurements 1313 are set to the aggregated measure values calculated in step 2405. The segments request network measurements 1320 and response network measurements 1330 remain blank, as the monitored TCP/IP message transfer is not split into a request and a response part. Following step 2407 adds the created network measurement records to the network segment measurement list 1305 of the path correlation node 1301 describing the communication. The process then ends with step 2408.

TCP/IP measure request records 2410 which may be used to send a request for network measurements describing the transfer of a specific measure over a TCP/IP connection are shown in FIG. 24b. A TCP/IP measure request record 2410 may contain but is not limited to a sender IP address and port 2411, receiver IP address and port 2412 which may in combination be used to identify a specific TCP/IP connection, a start byte index 2413 and an end byte index 2414 which may in combination be used to identify the TCP/IP packets within a TCP/IP connection that correspond to a specific message sent over the TCP/IP connection.

FIG. 24c depicts a TCP/IP measure response record 2420 which may be used to transfer specific and ambient performance measurements for individual TCP/IP packets for a specific network segment from a network probe 1811 to a monitoring node 350. A TCP/IP measure response record 2420 may contain but is not limited to a network segment id 2421 identifying a specific network segment monitored by a specific network probe 1811, a per packet specific measures list 2422 and a per packet ambient measures list to transfer specific and ambient performance measures describing performance parameters for a set of TCP/IP packets. The per packet specific measure list 2422 and the per packet ambient measure list may contain for each recorded measure type and for each TCP/IP packet an entry containing a measure type id and a measure value. An example entry would provide a measure type id "number of resends" and a value of "3". Those entries are sorted according to the sequence numbers of the TCP/IP packets they correspond to.

The processing of a received TCP/IP measure request 2410 by a network probe 1811 is shown in FIG. 25. The process starts with step 2501 when the network probe receives a TCP/IP measure request 2410, and continues with step 2502 which extracts sender and receiver address and port, start and end byte index from the received request. Subsequent step 2503 fetches the list of TCP/IP measure records 2310 from the packet measurement buffer 1813 which have a matching sender and receiver address and port, and which have a sequence number 2314 equal or greater to the received start byte index 2413 plus the start sequence number 1914 or 2319 of the used TCP/IP connection, and which have a sequence number 2314 smaller than the received end byte index 2414 plus the start sequence number 1914 or 2314 of the used TCP/IP connection. The TCP/IP measure records 2310 may be stored in the packet measurement buffer in a way the supports the query performed in step 2503. As an example, the packet measurement buffers may be grouped according to the TCP/IP connection they belong to (i.e. sender and receiver address and port), and within each group be sorted according to their sequence number. Subsequent step 2504 creates a TCP/IP measure response 2420 using specific 2320 and ambient 2321 measure data from the fetched TCP/IP packet measure records to create a TCP/IP measure response, which is afterwards sent to the requesting monitoring node 350 for correlation. The process then ends with step 2505.

Some alternative embodiments may perform the step 2405 which creates aggregated network measures out of per packet network measures already on the network probe and only send those aggregated network measures to the monitoring node to save network bandwidth.

FIG. 26 exemplary depicts communication performed between application protocol specific sensors and TCP/IP sensors to create TCP/IP sequence number based tracing and correlation data in case no application protocol specific sensor is available (i.e. application level protocol unknown to monitoring system), and to skip TCP/IP sensors otherwise, when an application protocol specific sensor is available (i.e. application level protocol known to monitoring system). Typically, application level protocol calls are performed synchronously within one thread and internally perform, within the same thread, TCP/IP API calls to transfer data representing the application protocol call.

An exemplary situation where first a communication using an application protocol know by the monitoring system is performed and afterwards a communication using an application protocol unknown to the monitoring system performed by a thread 2601 is shown in FIG. 26. Sensors specific for application level protocols 2610 and 2612 (e.g. request sensor 303, response sensor 305 or tag extraction sensor 332) and TCP/IP sensors 2611 (e.g. TCP/IP send sensor 1802 or TCP/IP receive sensor 1810) use a thread local storage 2630 for interaction. The thread local storage 2630 is already used to share correlation data 2631 required to identify executing thread and method call sequence and nesting level between sensors, e.g. according to the teachings of U.S. Pat. No. 8,234,631. The thread local storage 2630 may be extended by a known protocol indicator 2631 which may be used to indicate whether the thread currently executes a communication using an application protocol known by the monitoring system.

Within the thread execution, first a method 2602 related to a communication using an application level protocol known by the monitoring system is executed. This method 2603 is instrumented with a protocol specific entry sensor 2610, which reports the start of the protocol call, and which additionally updates 2620 the known protocol indicator (KPI) 2632 to indicate an ongoing call using an application protocol known by the monitoring system.

Method 2602 internally calls methods 2 2603, e.g. for preparations and then method 3 2604 to perform the data transfer. Method 3 2604 performs method calls to send or receive data using a TCP/IP connection 2605. Those methods may be instrumented with TCP/IP sensors 2611, capable to provide tracing and correlation data based on cumulative transferred data as described earlier. Before creating correlation and trace data, the TCP/IP sensors 2611 may check the KPI 2632 of the thread local storage 2630 if it indicates the execution of an enclosing application protocol call known (and instrumented) by the monitoring system, as e.g. call 2602 and nested calls. In case of an indicated call of an application protocol known by the monitoring system, the execution of the TCP/IP sensors 2611 may be skipped, as trace data describing the communication is already provided by application protocol specific sensors 2610 and 2612. After method 3 2604 and execution of TCP/IP send or receive calls 2605 are finished, method 4 2606 is executed, and the method call performing the communication using an application protocol known by the monitoring system is finished 2607. This triggers the execution of the protocol specific exit sensor 2612, which notifies the finished communication, and which also sets the KPI 2632 in the thread local storage 2630 to indicate that no call performing a communication using an application protocol known by the monitoring system is ongoing.

Afterwards, method 2608 is executed, which performs a communication using an application level protocol that is unknown by the monitoring system. Consequently, this method is also not instrumented with a protocol specific sensor, and the KPI 2632 of the thread local storage is not changed. The nested call to send or receive data via a TCP/IP connection 2605 is instrumented with a TCP/IP sensor, which checks the KPI 2632 if an enclosing application protocol call known by the monitoring system is ongoing. As this is not indicated, the TCP/IP sensors 2611 are in this case not skipped, and transaction tracing and correlation data is created by the TCP/IP sensors.

It is noteworthy that in case of an enclosing application protocol known by the monitoring system, only those parts of the TCP/IP sensor that perform creation and sending of trace and correlation data (e.g. steps 2106 and 2107 and 2111 of a TCP/IP send sensor 1802, or steps 2125, 2126 and 2128 of a TCP/IP receive sensor 1810) may be skipped, but steps to update usage data of the TCP/IP connection (e.g. steps 2102 to 2104 and step 2109 for a TCP/IP send sensor or steps 2121 to 2124 and step 2127) are still executed in this case.

A combined network probe (i.e. combination of network probe 341 and network probe 1811) capable to provide network monitoring data on application protocol and on TCP/IP level, may contain a list of application protocols known by the monitoring system, for which specific sensors are available on the server side. In case the combined network probe detects an application protocol that is known by the monitoring system, it may act like network probe 341. In case the network probe fails to detect the application protocol, or the detected application protocol is not on the list of known application level protocols (the network probe may be capable to detect more application protocols that the monitoring system as a whole is capable to monitor), the combined network probe may act like network probe 1811 and provide network monitoring data on TCP/IP packet level.

To upgrade a monitoring system with new sensor sets dedicated to an additional application protocol, it would be sufficient to update instrumentation of sender and receiver applications, and to add the new application protocol to the list of known application protocols of the combined monitoring nodes belonging to the updated monitoring system.

The previously described method of using the cumulative bytes sent over a connection in addition to identification data of the connection (for TCP/IP based networks, IP address of sender and receiver and port number on sender and receiver side) as correlation data may also be used by monitoring system directed to the monitoring of server side activity only. In this case, a correlation engine would receive correlation data containing connection identification data and cumulative byte count data from sender and receiver and would use this data to find matching tracing data describing sender and receiver side activities without usage of a network probe. This would allow such a monitoring system to trace transactions using an application level protocol unknown to the monitoring system.

The term instrumentation as used herein refers to manipulation of exiting application code to inject additional code that performs performance measurement into this existing application code. The injected additional code does not change the functionality of the existing application code. Injection may be performed on source code level, manually or automatically before compile time, or on bytecode level. Bytecode level injections may either be performed permanently by manipulating and storing existing bytecode libraries representing the application code, or temporarily and on-the-fly, when bytecode is loaded for execution.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring a distributed transaction by a monitoring system across a distributed computing environment, comprising:
    detecting, by a tagging sensor instrumented in a send application, a transaction initiated by the send application residing on a first computing device, where the transaction is initiated by the send application sending a request over a network to a receive application located remotely from the first computing device and the request is comprised of one or more data packets;
    determining, by the tagging sensor, identifying information for the request;
    tagging, by the tagging sensor, the one or more data packets associated with the request with the identifying information for the request;
    generating, by the tagging sensor, a request event indicating the request was sent by the send application, where the request event includes the identifying information;
    sending, by the tagging sensor, the request event to an event correlator residing on a monitoring node located remotely from the first computing device;
    determining, by a network probe, one or more metrics indicative of network performance for the network;
    detecting, by the network probe, the one or more data packets associated with the request;
    extracting, by the network probe, the identifying information for the request from the one or more data packets;
    generating, by the network probe, a measurement event, where the measurement event includes the identifying information for the request and the metrics;
    sending, by the network probe, the measurement event to the event correlator; and
    correlating, by the event correlator, the request event with the measurement event using the identifying information.

2. The method of claim 1 wherein determining identifying information for the request by the tagging sensor further comprises tagging the request with an identifier for the send application, an identifier for an execution path which spawned the request and an identifier for method execution that initiates the request.

3. The method of claim 2 wherein determining identifying information for the request by the tagging sensor further comprises
    determining whether the request can be altered by the tagging sensor;
    retrieving a message identifier from the message, the retrieval in response to a determination that the request cannot be altered by the monitoring system; and
    appending the message identifier to the request event.

4. The method of claim 1 wherein determining one or more metrics further comprises at least one of extract metrics from the one or more data packets and deriving metrics from data collected over time by the network probe.

5. The method of claim 2 wherein determining identifying information for the request by the network probe further comprises extracting the identifier for the send application, the identifier for an execution path and the identifier for the method execution from the one or more data packets.

6. The method of claim 3 wherein determining identifying information for the network probe further comprises extracting the message identifier from the one or more data packets, the extraction in response to a determination that the request cannot be altered by the monitoring system.

7. The method of claim 1 wherein generating a measurement event further comprises appending a network segment identifier to the measurement event, where the network segment identifier is associated with a particular segment of the network and known to the network probe.

8. The method of claim 1 wherein correlating the request event with the measurement event further comprises
    extracting the identifying information from the request event;
    extracting the identifying information from the measurement event;
    comparing the identifying information from the request event to the identifying information from the measurement event; and
    associating the request event with the measurement event when the identifying information matches.

9. The method of claim 8 further comprises
    storing, by the event correlator, at least one of the request event and the measurement event in a buffer; and
    correlating, by the event correlator, the request event with the measurement event upon receipt of both the request event and the measurement event.

10. The method of claim 1 further comprises
    detecting, by a tag extraction sensor instrumented in the receive application, receipt of the request by the receive application;
    generating, by the tag extraction sensor, a receive event indicating that the request was received, where the receive event includes the identifying information to the request; and
    sending, by the tag extraction sensor, the receive event to the event correlator.

11. The method of claim 10 further comprises correlating, by the event correlator, the receive event with the request event and the measurement event.

12. The method of claim 10 further comprises
    detecting, by the tag extraction sensor, a response to the request sent by the receive application, where the response is sent by the receive application over the network to the send application;
    determining, by the tag extraction sensor, identifying information for the response;
    generating, by the tag extraction sensor, a response event indicating that the response was sent, where the response event includes the identifying information for the response and
    sending, by the tag extraction sensor, the response event to the event correlator.

13. A computer-implemented method for monitoring a distributed transaction by a monitoring system across a distributed computing environment, comprising:
    detecting, by a tag extraction sensor instrumented in a receive application residing on a computing device, receipt of a request by the receive application, where the request was sent by a send application over a network to the receive application and the request is comprised of one or more data packets;

determining, by the tag extraction sensor, identifying information for the request;

tagging, by the tag extraction sensor, the one or more data packets associated with the request with the identifying information for the request;

generating, by the tag extraction sensor, a receive event indicating the request was received, where the receive event includes the identifying information for the request;

sending, by the tag extraction sensor, the receive event to an event correlator residing on a monitoring node located remotely from the computing device;

determining, by a network probe, one or more metrics indicative of network performance for the network;

detecting, by the network probe, the one or more data packets associated with the request;

extracting by the network probe, the identifying information for the request from the one or more data packets;

generating, by the network probe, a measurement event, where the measurement event includes the identifying information for the request and the metrics;

sending, by the network probe, the measurement event to the event correlator; and correlating, by the event correlator, the received event with the measurement event using the identifying information.

14. The method of claim 13 wherein determining identifying information for the request by the tag extraction sensor further comprises retrieving from the request an identifier for the send application, an identifier for an execution path which spawned the request and an identifier for method execution that initiates the request.

15. The method of claim 14 wherein determining identifying information for the request by the tag extraction sensor further comprises determining whether the request can be altered by the monitoring system;

retrieving a message identifier from the message, the retrieval in response to a determination that the request cannot be altered by the monitoring system; and appending the message identifier to the receive event.

16. The method of claim 13 wherein determining one or more metrics further comprises at least one of extract metrics from the one or more data packets and deriving metrics from data collected over time by the network probe.

17. The method of claim 14 wherein determining identifying information for the request by the network probe further comprises extracting the identifier for the send application, the identifier for an execution path and the identifier for the method execution from the one or more data packets.

18. The method of claim 15 wherein determining identifying information for the network probe further comprises extracting the message identifier from the one or more data packets, the extraction in response to a determination that the request cannot be altered by the monitoring system.

19. The method of claim 13 wherein generating a measurement event further comprises appending a network segment identifier to the measurement event, where the network segment identifier is associated with a particular segment of the network and known to the network probe.

20. The method of claim 13 wherein correlating the receive event with the measurement event further comprises extracting the identifying information from the receive event;

extracting the identifying information from the measurement event;

comparing the identifying information from the receive event to the identifying information from the measurement event; and associating the receive event with the measurement event when the identifying information matches.

21. The method of claim 20 further comprises storing, by the event correlator, at least one of the receive event and the measurement event in a buffer; and correlating, by the event correlator, the receive event with the measurement event upon receipt of both the receive event and the measurement event.

22. A network probe for use in a performance monitoring system, comprising a packet detection unit configured to detect data packets traversing through the network;

a measurement acquisition unit configured to receive the detected data packets from the packet detection unit and operates to determine one or more metrics indicative of network performance for the network;

a transaction demarcation unit configured to receive the detected data packets from the packet detection unit, the transaction demarcation unit operates to identify a network transaction and associate detected data packets with an identified network transaction;

a trace extractor unit that operates to extract identifying information for an identified network transaction; and a measurement tagging unit in data communication with the measurement acquisition unit and the trace extractor unit, the measurement tagging unit generates a measurement event and sends the measurement event to an event correlator residing on a monitoring node located remotely from the network probe, where the measurement event includes the identifying information for the identified network transaction and the metrics and the network probe implemented by computer-executable instructions executed by a processor of a computing device.

23. The network probe of claim 22 wherein the trace extractor unit determines whether an identified network transaction can be altered and determines identifying information for the identified network transaction by extracting the identifying information from the detected data packets, the extraction in response to a determination that the identified network transaction can be altered by the monitoring system.

24. The network probe of claim 23 wherein the identifying information includes an identifier for an application that initiated the identified network transaction, an identifier for an execution path which spawned the identified network transaction and an identifier for the method execution that initiated the identified network transaction.

25. The network probe of claim 23 wherein the trace extractor unit determines identifying information for the identified network transaction by extracting a message identifier assigned to the message, the extraction in response to a determination that the identified network transaction cannot be altered.

26. The network probe of claim 22 wherein the measurement tagging unit appends a network segment identifier to the measurement event, where the network segment identifier is associated with a particular segment of the network and known to the network probe.

27. A computer-implemented system for monitoring a distributed transaction across a distributed computing environment, comprising:

a tagging sensor instrumented in a send application and operable to detect a transaction initiated by the send application, where the send application initiates the transaction by sending a request over a network to a receive application and the request is comprised of one or more data packets;

the tagging sensor, in response to detecting the transaction, determines identifying information for the request, tags the one or more data packets associated with the request with the identifying information for the request, generates a request event indicating the request was sent by the send application and sends the request event to a monitoring node, where the request event includes the identifying information;

a network probe configured to detect one or more data packets associated with the request traversing through the network and determine one or more metrics indicative of network performance for the network;

the network probe, in response to detecting one or more data packets associated with the request, determines the identifying information for the request from the one or more data packets, generates a measurement event and sends the measurement event to the monitoring node, where the measurement event includes the identifying information for the request and the metrics;

an event correlator residing on the monitoring node and correlates the request event with the measurement event using the identifying information.

28. The system of claim 27 further comprises a tag extraction sensor instrumented in the receive application and operable to detect the request sent by the send application, the tag extraction sensor, in response to detecting the request, determines identifying information for the request, generates a receive event indicating that the request was received, and sends the receive event to the monitoring node, where the receive event includes the identifying information; wherein the event correlator correlates the receive event with the request event.

29. The system of claim 27 wherein the network probe sends the measurement events to a network monitoring node and the measurement events are stored in a network measurement buffer residing on the network monitoring node, where the network monitoring node differs from the server monitoring node.

30. The system of claim 29 wherein the event correlator is configured to detect a network performance problem and operates, in response to detecting the network performance problem, to query the measurement events from the network monitoring node.

31. The method of claim 1 wherein detecting, by the network probe, the one or more data packets associated with the request by intercepting data packets after the request has been sent by the send application and before the request is received by the receive application.

* * * * *